US008923679B2

(12) United States Patent
Xing

(10) Patent No.: US 8,923,679 B2
(45) Date of Patent: Dec. 30, 2014

(54) METHOD AND PHASE-CHANGE GAIN-FIBER HOLDER THAT CONTROL TEMPERATURE RISE AND UNIFORMITY WITH MINIMAL STRESS

(71) Applicant: Lockheed Martin Corporation, Bethesda, MD (US)

(72) Inventor: Andrew C. Xing, Bothell, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 79 days.

(21) Appl. No.: 13/831,477

(22) Filed: Mar. 14, 2013

(65) Prior Publication Data

US 2014/0054021 A1  Feb. 27, 2014

Related U.S. Application Data

(60) Provisional application No. 61/692,692, filed on Aug. 23, 2012.

(51) Int. Cl.
*G02B 6/00* (2006.01)
*F28F 23/00* (2006.01)
*F28D 15/02* (2006.01)
*F28F 9/00* (2006.01)
*G02B 6/42* (2006.01)

(52) U.S. Cl.
CPC . *F28F 9/00* (2013.01); *F28F 23/00* (2013.01); *F28D 15/0266* (2013.01); *F28D 15/02* (2013.01); *G02B 6/4268* (2013.01)
USPC ............ 385/135; 385/134; 385/136; 385/137

(58) Field of Classification Search
USPC .................................. 385/134, 135, 136, 137
See application file for complete search history.

(56) References Cited

U.S. PATENT DOCUMENTS 6,178,187 B1   1/2001  Ueda
6,301,423 B1  10/2001  Olson
(Continued)

FOREIGN PATENT DOCUMENTS

JP         03004092 A     1/1991

OTHER PUBLICATIONS

Lapointe, et al., "Thermal Effects in High-Power CW Fiber Lasers", "Proceeding of SPIE (Photonics West 2009)", 2009, pp. 71951U-71951U-11, vol. 7195.

*Primary Examiner* — Jennifer Doan
(74) *Attorney, Agent, or Firm* — Charles A. Lemaire; Jonathan M. Rixen; Lemaire Patent Law Firm, P.L.L.C.

(57) ABSTRACT

A thermal-management optical-fiber packaging system that includes an optical fiber and a temperature-management device configured to remove excess heat from the optical fiber. In some embodiments, the temperature-management device includes a first housing having a first outer-perimeter surface and an inner volume facing a first inner surface (wherein the inner volume has a length), a plurality of fiber-support members coupled to, and/or integral with, the first inner surface of the first housing, wherein each of the fiber-support members has one or more small-area-of-contact supports arranged along the length of the inner volume, and wherein each small-area-of-contact support is configured to provide a small area (e.g., a point) of contact with the optical fiber, and wherein the optical fiber follows a coiled path around the inner volume. A thermal-management material surrounds the optical fiber except at those locations where the optical fiber contacts the fiber-support members.

20 Claims, 14 Drawing Sheets

(56) References Cited

U.S. PATENT DOCUMENTS

| | | |
|---|---|---|
| 6,377,591 B1 | 4/2002 | Hollister et al. |
| 6,424,784 B1 | 7/2002 | Olson |
| 6,456,756 B1 | 9/2002 | Mead |
| 6,535,684 B1 | 3/2003 | Kondo et al. |
| 6,581,445 B1 * | 6/2003 | Weiss ............................... 73/75 |
| 6,795,460 B1 | 9/2004 | Itoh |
| 6,829,426 B1 | 12/2004 | Arellano |
| 6,968,112 B2 | 11/2005 | Zamel et al. |
| 6,973,250 B2 * | 12/2005 | Sabry et al. .................. 385/135 |
| 7,044,768 B1 | 5/2006 | Tilton et al. |
| 7,199,924 B1 | 4/2007 | Brown et al. |
| 7,391,561 B2 | 6/2008 | Di Teodoro et al. |
| 7,400,812 B2 | 7/2008 | Seifert |
| 7,429,734 B1 | 9/2008 | Tidwell |
| 7,430,352 B2 | 9/2008 | Di Teodoro et al. |
| 7,457,502 B2 | 11/2008 | Davis |
| 7,471,705 B2 | 12/2008 | Gerstenberger et al. |
| 7,620,077 B2 | 11/2009 | Henderson |
| 7,701,987 B1 | 4/2010 | Savage-Leuchs et al. |
| 7,746,638 B2 | 6/2010 | Takawa et al. |
| 7,768,700 B1 | 8/2010 | Savage-Leuchs |
| 7,792,166 B2 | 9/2010 | Borschowa |
| 7,872,794 B1 | 1/2011 | Minelly et al. |
| 7,924,500 B1 | 4/2011 | Minelly |
| 7,957,623 B2 | 6/2011 | Panarello et al. |
| 8,023,542 B2 | 9/2011 | Vetrovec |
| 8,340,482 B2 | 12/2012 | Arashitani et al. |
| 8,441,718 B2 | 5/2013 | Mead |
| 2007/0115635 A1 | 5/2007 | Low et al. |
| 2011/0091155 A1 | 4/2011 | Yilmaz et al. |
| 2011/0228483 A1 | 9/2011 | Togami et al. |
| 2012/0085518 A1 | 4/2012 | Ichkahn et al. |
| 2012/0111036 A1 | 5/2012 | Campbell et al. |

* cited by examiner

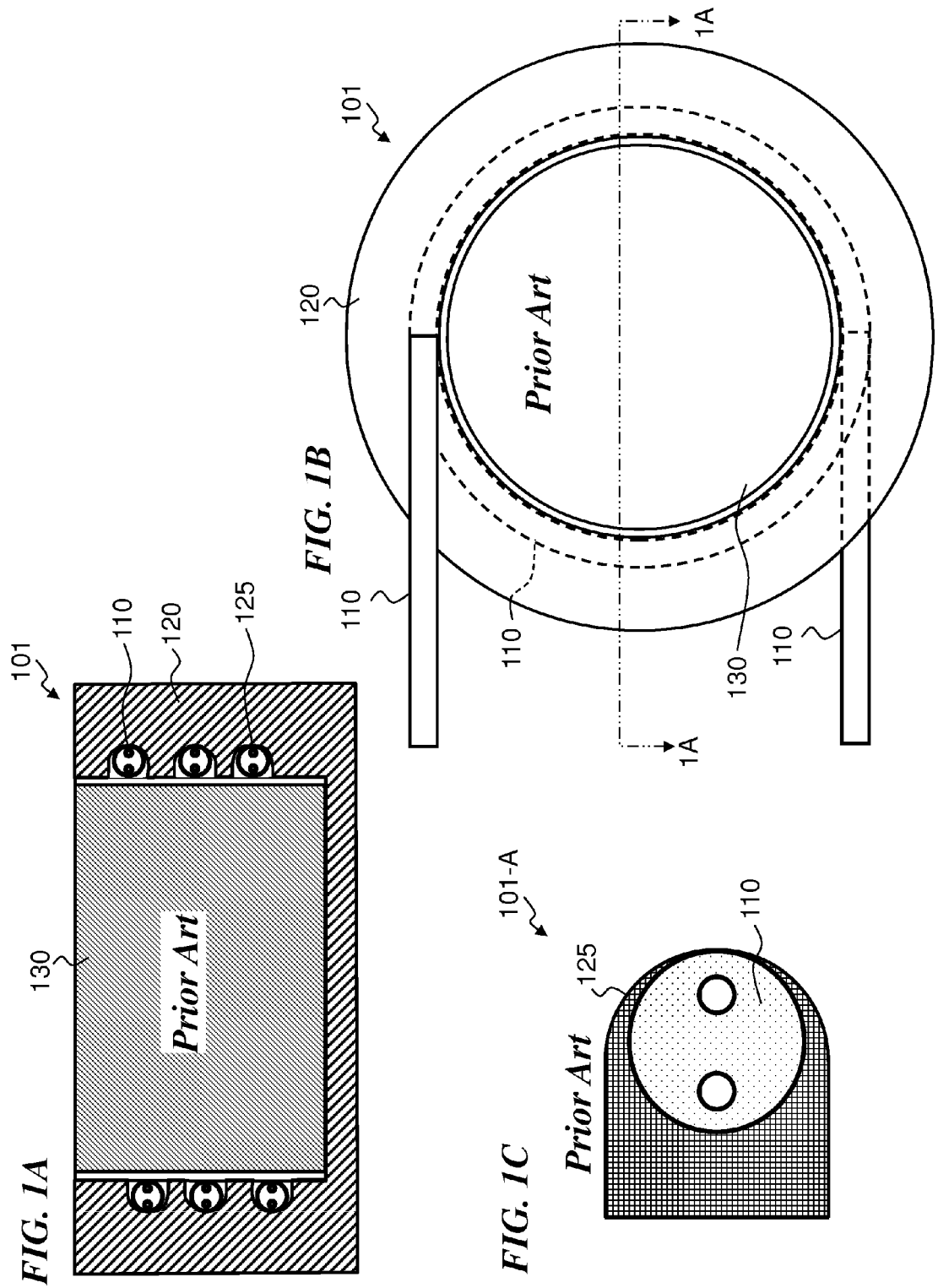

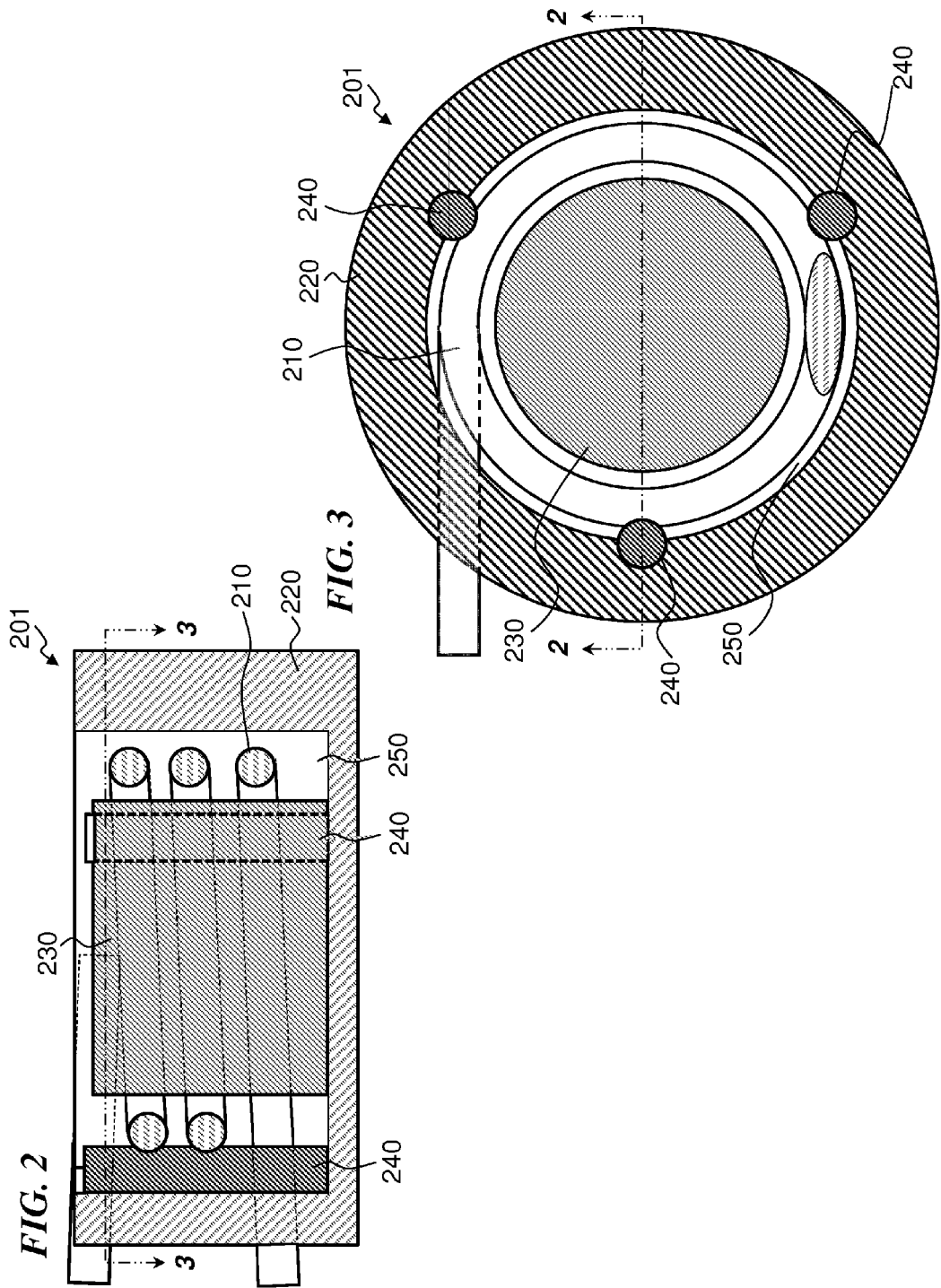

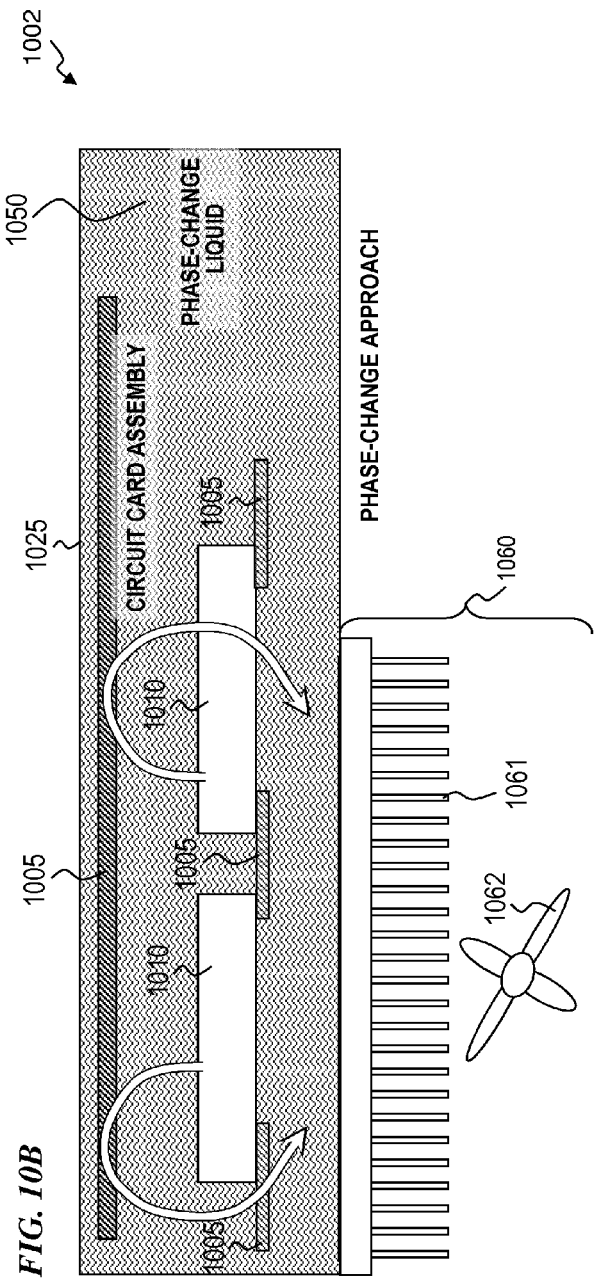
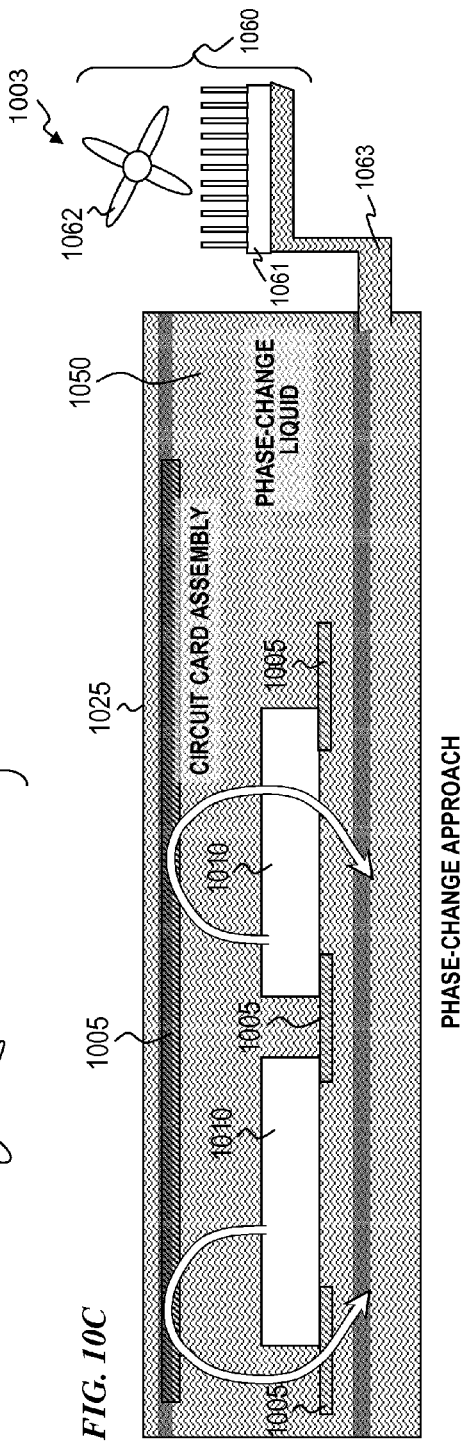
FIG. 10B
FIG. 10C

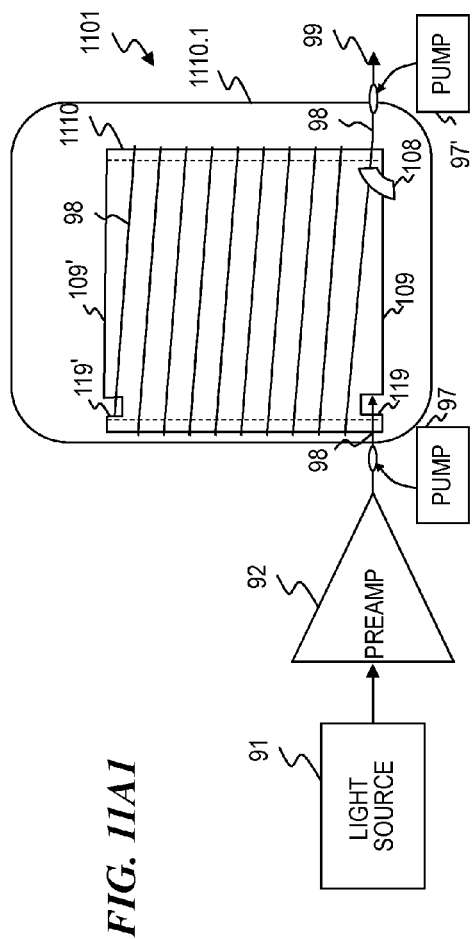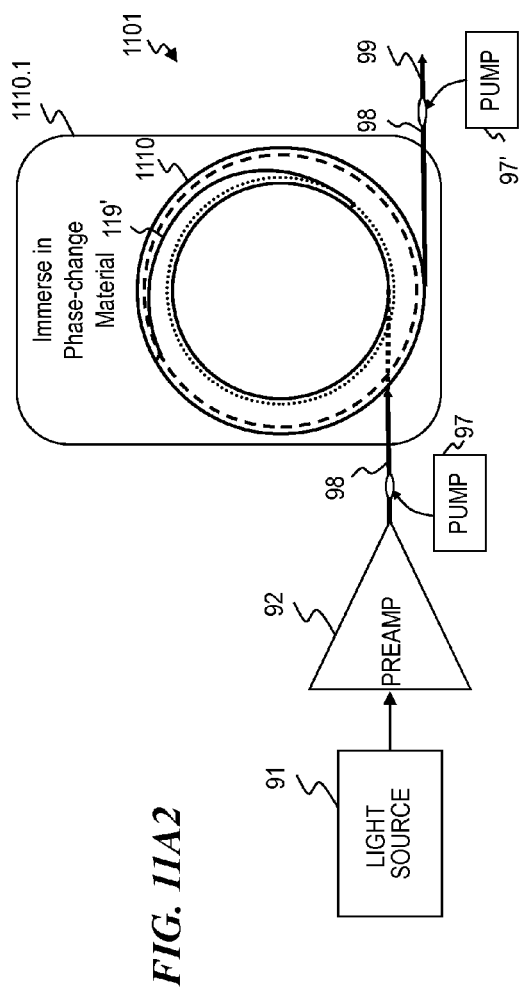

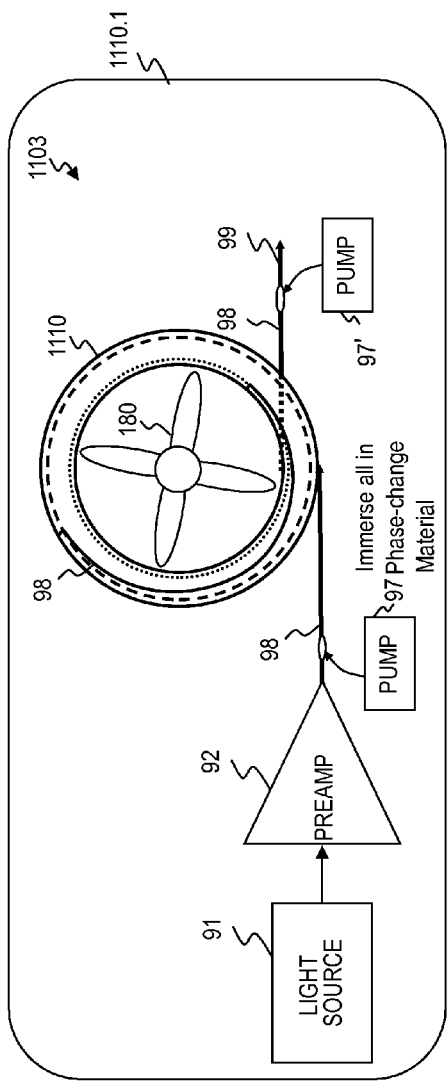
FIG. 11A3
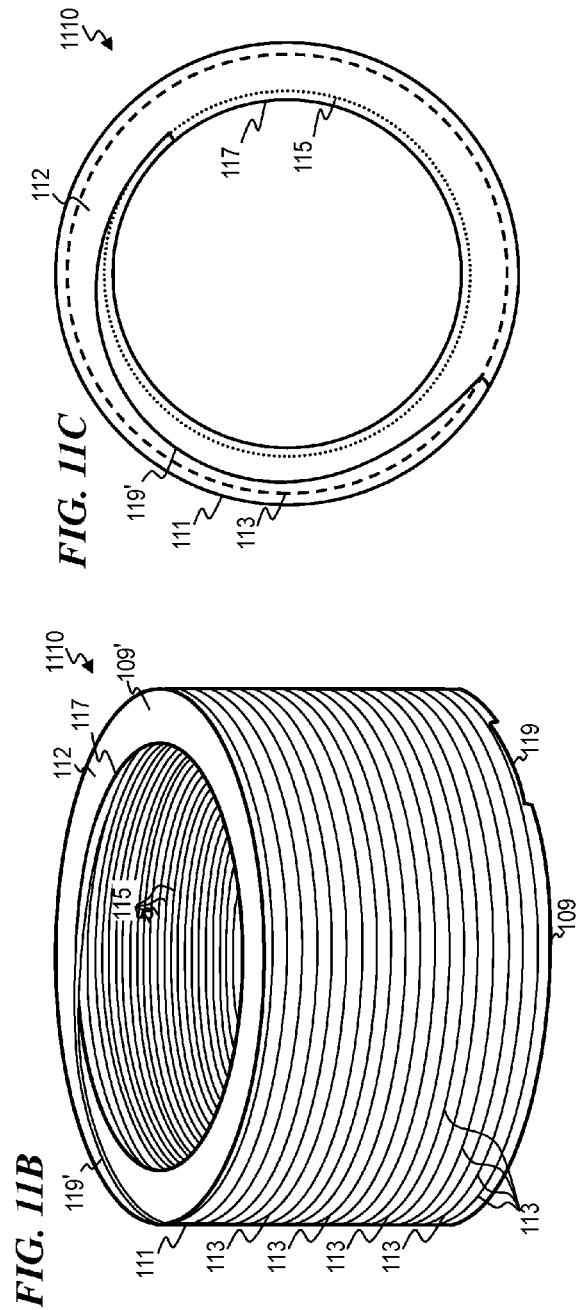
FIG. 11B
FIG. 11C

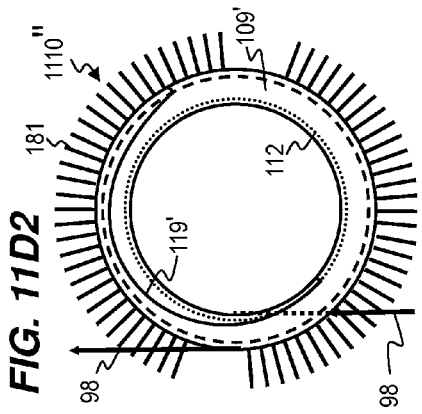
FIG. 11D2
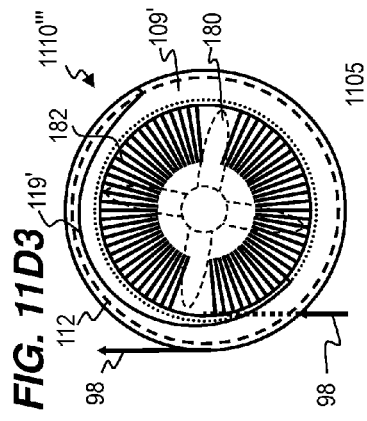
FIG. 11D3
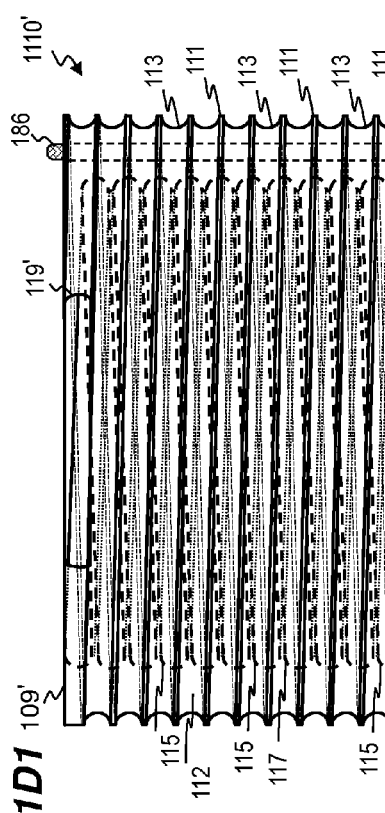
FIG. 11D1
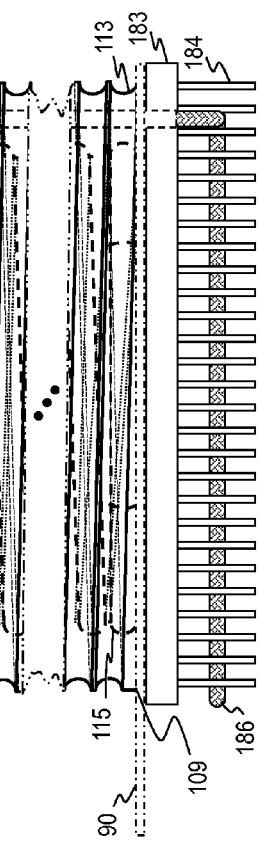
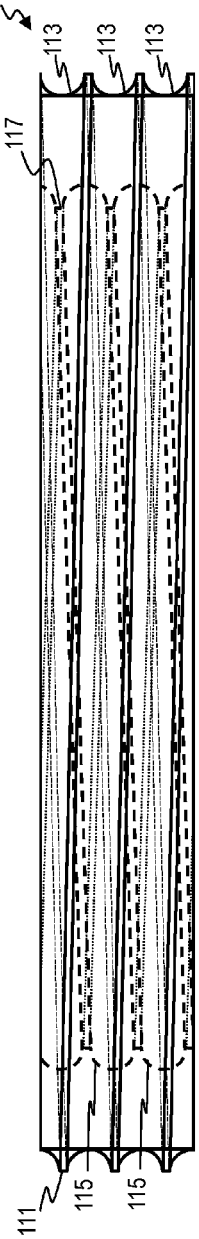
FIG. 11E

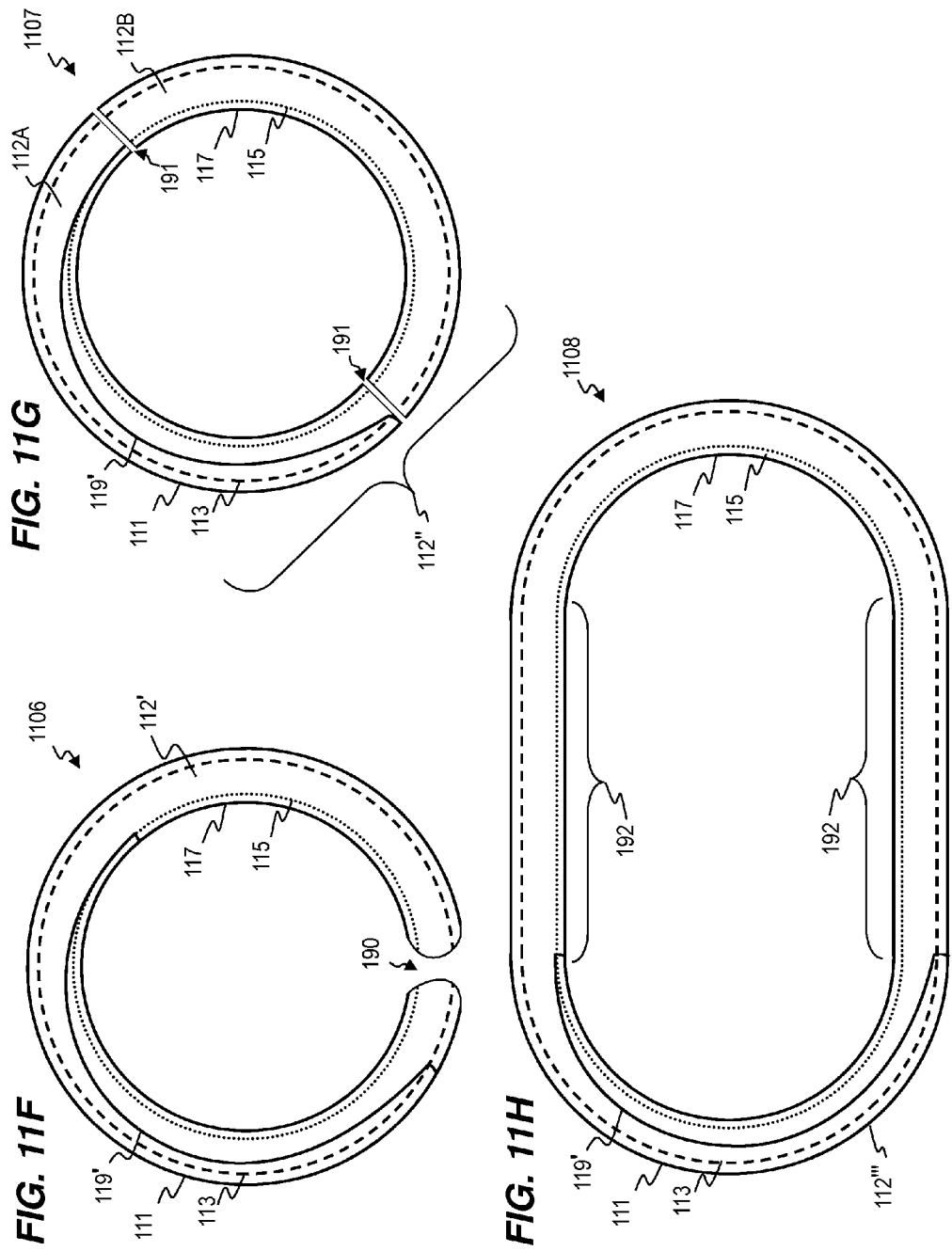

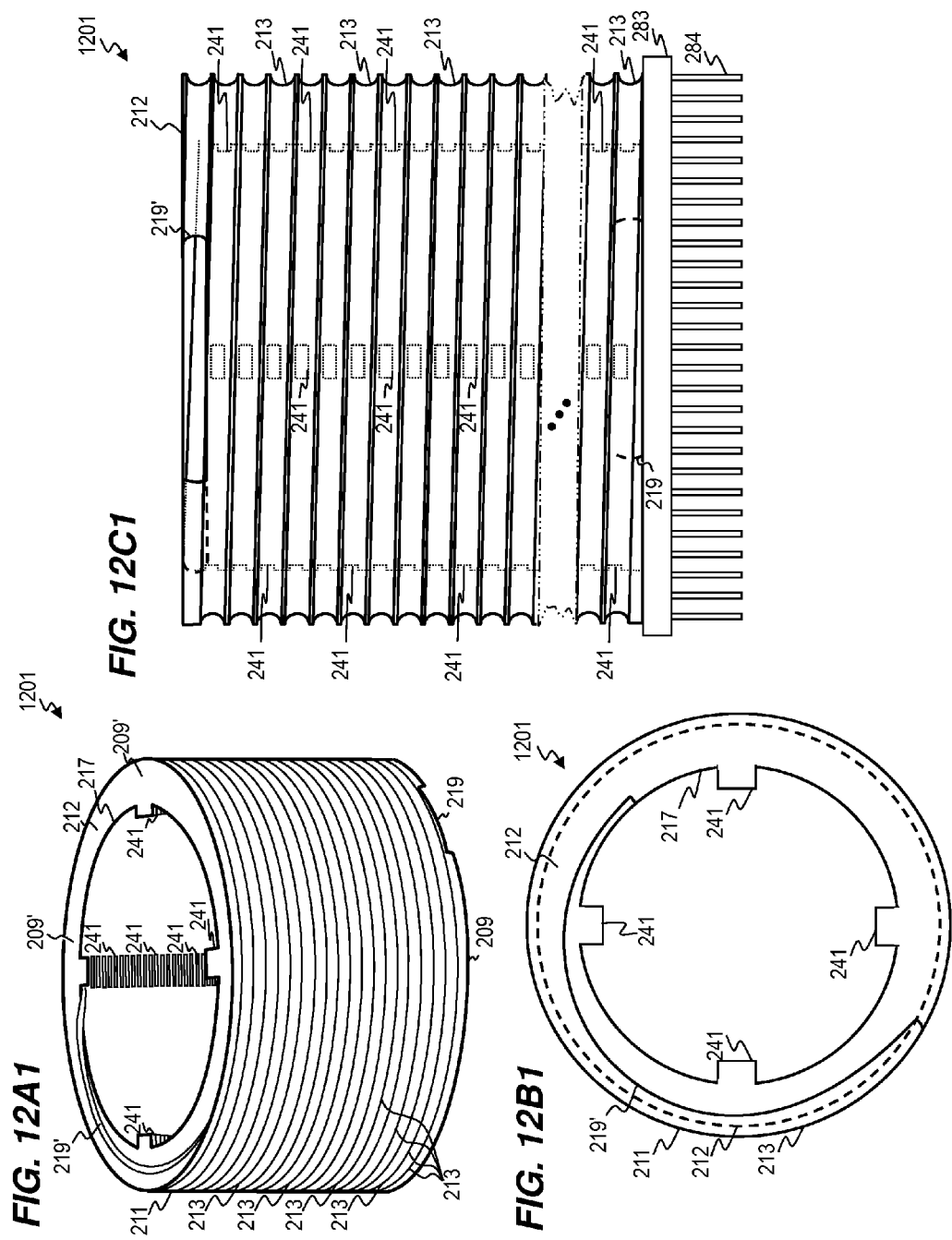

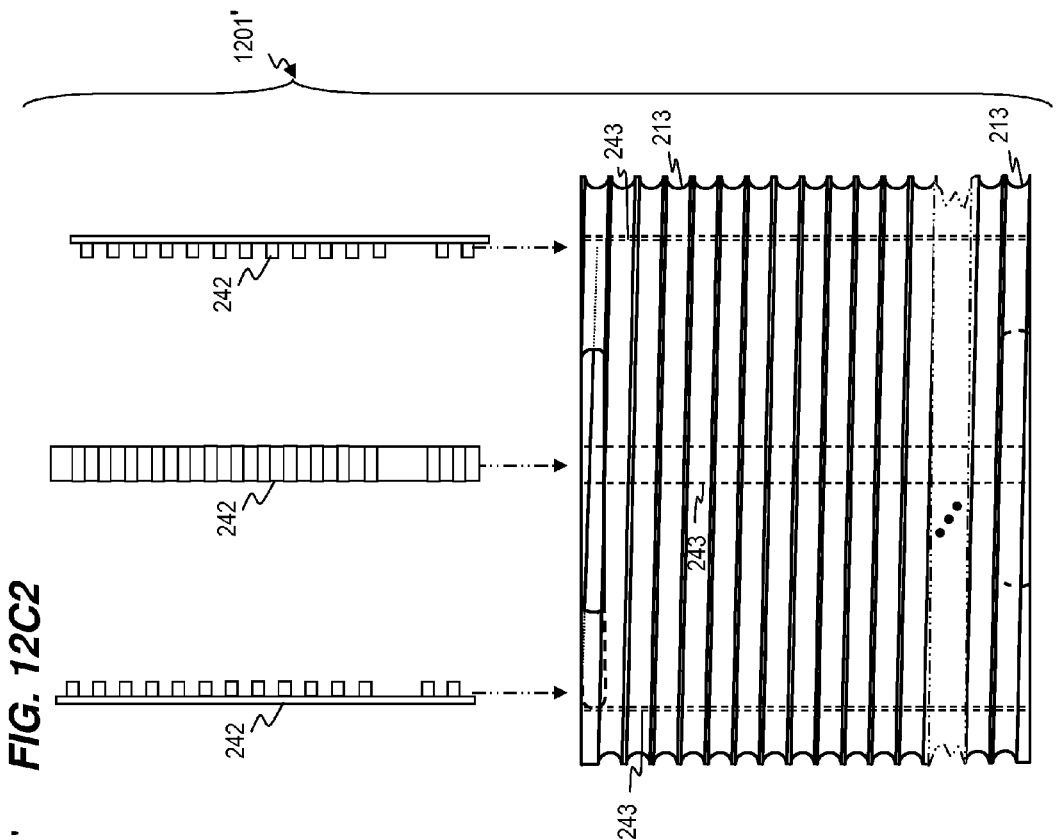
FIG. 12C2
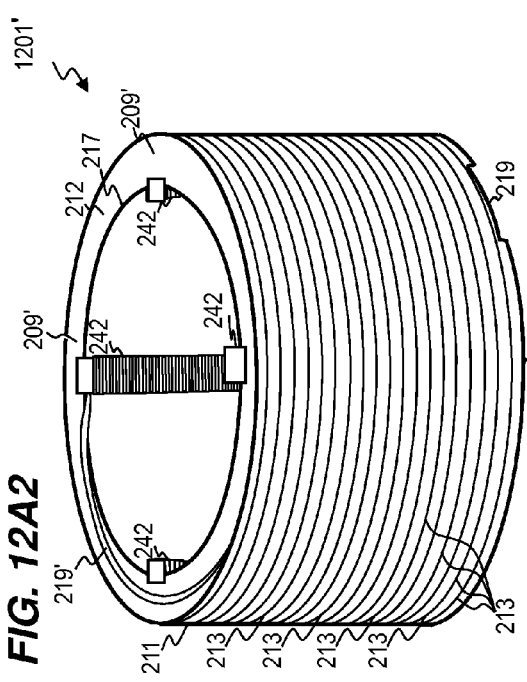
FIG. 12A2
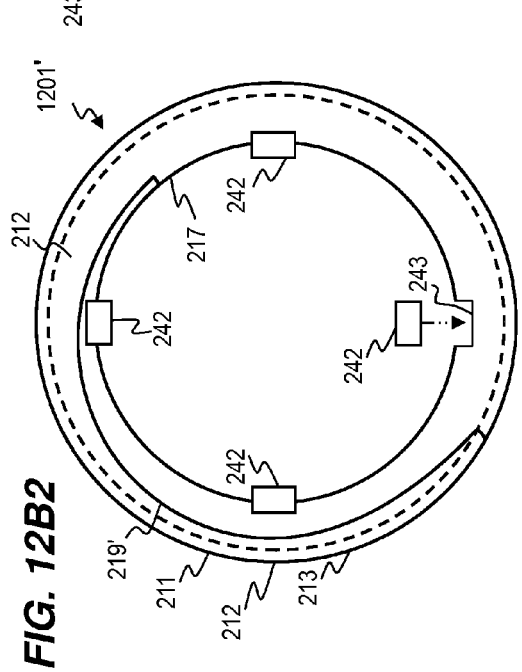
FIG. 12B2

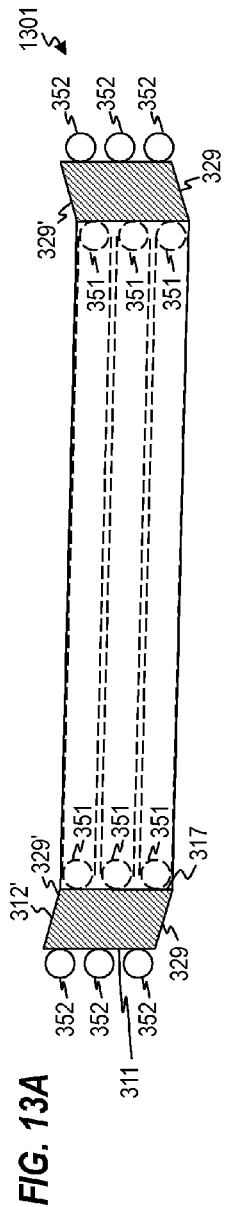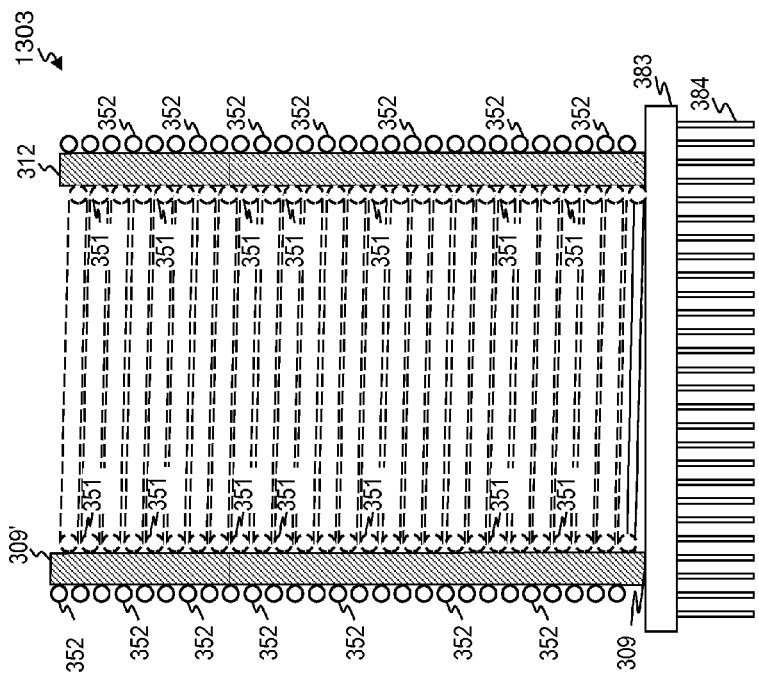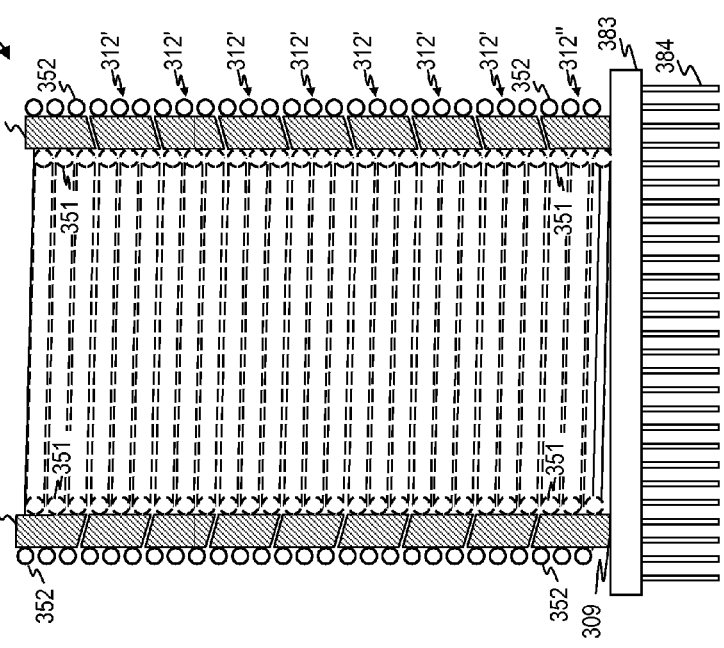
FIG. 13A
FIG. 13B
FIG. 13C

METHOD AND PHASE-CHANGE GAIN-FIBER HOLDER THAT CONTROL TEMPERATURE RISE AND UNIFORMITY WITH MINIMAL STRESS

CROSS-REFERENCE TO RELATED APPLICATIONS

This application claims priority benefit, under 35 U.S.C. §119(e), of U.S. Provisional Patent Application No. 61/692,692 filed Aug. 23, 2012 by Andrew Xing, titled "METHOD AND PHASE-CHANGE GAIN-FIBER HOLDER THAT CONTROL TEMPERATURE RISE AND UNIFORMITY WITH MINIMAL STRESS", which is incorporated herein by reference in its entirety.

This invention is related to:
U.S. patent application Ser. No. 12/953,292 filed Nov. 23, 2010 (which issued as U.S. Pat. No. 8,493,651 on Jul. 23, 2013), titled "APPARATUS FOR OPTICAL FIBER MANAGEMENT AND COOLING"; and
U.S. patent application Ser. No. 12/793,508 filed Jun. 3, 2010 (which issued as U.S. Pat. No. 8,355,608 on Jan. 15, 2013), titled "METHOD AND APPARATUS FOR IN-LINE FIBER-CLADDING-LIGHT DISSIPATION", each of which is incorporated herein by reference in its entirety.

FIELD OF THE INVENTION

The invention relates generally to optical gain fibers and, more particularly, to apparatus and methods for holding and cooling an optical gain fiber.

BACKGROUND OF THE INVENTION

Laser systems including fiber amplifiers are commonly used in many applications, including telecommunications applications and high power military and industrial fiber optic applications. Fiber amplifiers generally include optical fibers that passively transmit optical power, fibers that experience or are designed to enhance performance of a laser through non-linear optical processes such as Raman-shifting and Brillouin scattering, and/or optical fibers that are doped with a lasing ion embedded in the fiber material (i.e., gain fibers).

Although laser systems generate coherent output power in a manner that is intrinsically efficient, the quantum defect limit (i.e., the difference in the photon energy at which the process is pumped versus the energy of the radiated "lasing" photons), spontaneous radiation losses, miscellaneous optical absorption losses, and other non-productive processes lead to a thermal energy release that heats the fiber amplifier. Elevated temperatures in the fiber amplifier can degrade the efficiency of the laser system, lead to unacceptable optical distortions or, in the extreme, to failure of the fiber amplifiers or surrounding system materials and components.

One approach to controlling the temperature of gain fibers and fiber-amplifier systems is to wrap the gain fiber around a heat-sink device such as a mandrel. Conventional gain-fiber mandrels have a direct and continuous line contact between the surface of the mandrel (generally a metal surface) and one side of the fiber (generally a glass). This design causes the fiber to reach high temperatures due to poor thermal contact and results in a non-uniform temperature gradient in the fiber. The high temperatures and non-uniformity of temperature experienced by a gain-fiber that is cooled by a conventional gain-fiber mandrel causes the fiber to degrade, which, in turn, leads to a power drop of the fiber amplifier. As power to a fiber-amplifier system that is cooled with a conventional gain-fiber mandrel is turned on and off, the fiber also experiences stress fatigue due to the difference of the coefficient of thermal expansion between glass (the fiber) and metal (the surface of the mandrel). Fatigue stress also degrades the fiber and thus also leads to a power drop of the fiber amplifier.

U.S. Pat. No. 6,301,423 issued Oct. 9, 2001 to Grieg A. Olson, titled "METHOD FOR REDUCING STRAIN ON BRAGG GRATINGS," (hereinafter, "Olson '423") is incorporated herein by reference. Olson '423 describes a method for securing an optical fiber Bragg grating to a retaining element having a helical groove. In accordance with the method, an optical fiber Bragg grating is wrapped around the retaining element so that the optical fiber Bragg grating extends in and along the helical groove. Next, an excess length of the optical fiber Bragg grating is provided in the helical groove to substantially alleviate tension exerted upon the optical fiber Bragg grating. Finally, the first and second ends of the fiber Bragg grating are affixed to the retaining element.

U.S. Pat. No. 6,424,784 issued Jul. 23, 2002 to Grieg A. Olson, titled "GRATING COIL PACKAGE FOR REDUCED FIBER STRAIN," (hereinafter, "Olson '784") is incorporated herein by reference. Olson '784 describes a method for securing an optical fiber Bragg grating to a retaining element having a helical groove. In accordance with the method, an optical fiber Bragg grating is wrapped around the retaining element so that the optical fiber Bragg grating extends in and along the helical groove. Next, an excess length of the optical fiber Bragg grating is provided in the helical groove to substantially alleviate tension exerted upon the optical fiber Bragg grating. Finally, the first and second ends of the fiber Bragg grating are affixed to the retaining element.

U.S. Pat. No. 6,968,112 issued Nov. 22, 2005 to James M. Zamel et al., titled "COMPACT PACKAGING OF MULTIPLE FIBER LASERS," (hereinafter, "Zamel et al.") is incorporated herein by reference. Zamel et al. describe a compact fiber packaging system for fiber lasers that comprises a series of spools nested inside one another for efficient volume utilization. The spools comprise an inner spool nested inside at least one outer spool to form a module. Generally, the fiber lasers are wrapped around the inner spool, and then around successive outer spools as required to form the module. Furthermore, the modules may be stacked to form a fiber assembly. The compact fiber packaging system further comprises devices and methods for minimizing thermal gradients between fibers and for removing waste heat from the system. Additionally, the available volume is further utilized by disposing equipment and materials for operation of the fibers inside a hollow center defined by the inner spool, between the nested spools, and adjacent the nested spools.

U.S. Pat. No. 7,044,768 issued May 16, 2006 to Donald E. Tilton et al., titled "LIQUID THERMAL MANAGEMENT SOCKET SYSTEM," (hereinafter, "Tilton et al.") is incorporated herein by reference. Tilton et al. describe a liquid thermal management socket system for thermally managing an electronic device in a socket. The liquid thermal management socket system includes a thermal management unit having a chamber for receiving one or more electronic devices, a plurality of first connectors within the thermal management unit for electrically coupling with the electronic device, and a plurality of second connectors electrically coupled to the first connectors, wherein the second connectors extend from the thermal management unit for electrically coupling within a socket unit on a board. The thermal management unit may have a cap member attachable to a base portion in a sealed manner. The chamber within the thermal management unit may thermally manage an electronic device within via spray cooling, liquid immersion or other liquid cooling method.

U.S. Pat. No. 7,400,812 issued Jul. 15, 2008 to Martin Seifert, titled "APPARATUS AND METHODS FOR ACCOMMODATING LOOPS OF OPTICAL FIBER," (hereinafter, "Seifert") is incorporated herein by reference. Seifert describes an optical apparatus for accommodating optical fiber, such as one or more loops of optical fiber. The optical apparatus can include a body comprising an inwardly facing surface adapted for receiving a plurality of loops of a length of optical fiber. The body can include at least a portion wherein the inwardly facing surface is continuous between two adjacent loops. Methods and apparatus are disclosed for disposing the optical fiber with an optical apparatus for accommodating the optical fiber.

U.S. Pat. No. 7,457,502 issued Nov. 25, 2008 to James Albert Davis, titled "SYSTEMS AND METHODS OF COOLING A FIBER AMPLIFIER WITH AN EMULSION OF PHASE CHANGE MATERIAL," (hereinafter, "Davis") is incorporated herein by reference. Davis describes a system for cooling a fiber amplifier includes a fiber amplifier assembly, which, in turn, includes a longitudinally-extending fiber amplifier, a jacket and a retaining structure. The jacket surrounds the fiber amplifier and extends at least partially longitudinally therealong. In this regard, the jacket surrounds the fiber amplifier such that the fiber amplifier assembly defines a passage between the jacket and the fiber amplifier for the circulation of coolant therethrough. To facilitate the circulation of coolant, the retaining structure is disposed within the passage defined by the fiber amplifier assembly for at least partially maintaining a spacing between the fiber amplifier and jacket. The retaining structure and coolant can both comprise an emulsion of phase change material.

U.S. Pat. No. 7,957,623 issued Jun. 7, 2011 to Tullio Panarello et al., titled "DEFORMABLE THERMAL PADS FOR OPTICAL FIBERS," (hereinafter, "Panarello et al.") is incorporated herein by reference. Panarello et al. describe a system for fiber optic packaging includes a first substrate and a first deformable pad coupled to the first substrate. The first deformable pad is characterized by a thermal conductivity greater than 1 W/mK. The system also includes a fiber coil having at least a portion embedded in the first deformable pad to provide physical contact between the at least a portion of the fiber coil and the first deformable pad. The system further includes a second substrate coupled to the fiber coil and at least a portion of the first deformable pad.

U.S. Patent Application Publication 2010/0247055 (which issued as U.S. Pat. No. 8,340,482 on Dec. 25, 2012) to Yoshihiro Arashitani et al., titled "OPTICAL FIBER HOLDING APPARATUS," (hereinafter, "Arashitani et al.") is incorporated herein by reference. Arashitani et al. describe an optical fiber holding apparatus characterized in that the same comprises a surface in order to hold an optical fiber which is to be a state of which is rolled up so as not to overlap with each other, wherein at least the surface is formed of a thermo conductive molding body which has a thermal conductivity to be higher than or equal to 0.5 W/mK, and which has an Asker C hardness to be between twenty and fifty. Or, the same comprises a peripheral surface in order to roll up and hold an optical fiber, wherein at least the peripheral surface is formed of a thermo conductive molding body which has the thermal conductivity to be higher than or equal to 0.5 W/mK, and which has the Asker C hardness to be between twenty and fifty. Moreover, it is desirable for the thermo conductive molding body to have a compressive strength of which a peak value is between ten and thirty N/cm.sup.2 and a stabilized value is between three and ten N/cm.sup.2. Furthermore, it is desirable for the thermo conductive molding body to have the thermal conductivity to be higher than or equal to 1.0 W/mK and to have the Asker C hardness to be between twenty-five and forty.

U.S. Patent Application Publication 2012/0085518 (which issued as U.S. Pat. No. 8,467,426 on Jun. 18, 2013) to Joseph Ichkahn et al., titled "METHOD AND APPARATUS FOR COOLING A FIBER LASER OR AMPLIFIER," (hereinafter, "Ichkahn et al.") is incorporated herein by reference. Ichkahn et al. describe a system and method for cooling an optical fiber includes a flexible heat sink member, a heat pipe evaporator, and a thermal storage medium. The flexible heat sink member is in thermal contact with the optical fiber. The heat pipe evaporator is configured to dissipate heat from the optical fiber. The thermal storage medium is in thermal contact with the flexible heat sink member and the heat pipe evaporator. The flexible heat sink member is configured to compensate for any mismatch in coefficient of thermal expansion between material of the optical fiber and material of the flexible heat sink member so as to provide radial compliance and to maintain direct thermal contact between the optical fiber and the flexible heat sink member.

There remains a need for an improved method and system for packaging and cooling gain-fiber systems and fiber-amplifier systems.

BRIEF SUMMARY OF THE INVENTION

In some embodiments, the present invention provides an optical-fiber packaging system that includes an optical fiber; and a temperature-management device configured to remove excess heat from the optical fiber, the temperature-management device including: a first housing having a first outer-perimeter surface and an inner volume facing a first inner surface, wherein the inner volume has a length, a plurality of fiber-support members coupled to the first inner surface of the first housing, wherein each of the plurality of fiber-support members has a plurality of point supports arranged along the length of the inner volume, and wherein each point support is configured to provide a point contact with the optical fiber, and wherein the optical fiber follows a coiled path around the inner volume, and a thermal-management material that surrounds the optical fiber except for locations where the optical fiber contacts the plurality of fiber-support members.

In some embodiments, the present invention provides a method for removing excess heat from an optical fiber, the method including providing the optical fiber; providing a temperature-management device, wherein the temperature-management device includes: a first housing having a first outer-perimeter surface and an inner volume facing a first inner surface, wherein the inner volume has a length, a plurality of fiber-support members coupled to the first inner surface of the first housing, and a thermal-management material; coiling the optical fiber around the inner volume of the first housing, wherein the coiling of the optical fiber includes forming a plurality of point contacts between the optical fiber and each one of the plurality of fiber-support members; and surrounding the optical fiber with the thermal-management material except in locations where the optical fiber contacts the plurality of fiber-support members.

BRIEF DESCRIPTION OF THE FIGURES

Each of the items shown in the following brief description of the drawings represents some embodiments of the present invention.

FIG. 1A is a cross-sectional side view of a conventional (prior-art) optical-fiber packaging/cooling system 101.

FIG. 1B is a cross-sectional top view of conventional (prior-art) system 101.

FIG. 1C is a magnified portion 101-A of the cross-sectional side view shown in FIG. 1A.

FIG. 2 is a cross-sectional side view of an optical-fiber packaging/cooling system 201.

FIG. 3 is a cross-sectional top view of system 201.

FIG. 10B is a schematic (cross-section elevational view) diagram of a gain-fiber cooling system 1002.

FIG. 10C is a schematic (cross-section elevational view) diagram of a gain-fiber cooling system 1003.

FIG. 11A1 is a side-view schematic block diagram of an optical-gain-fiber system 1101, according to some embodiments of the invention.

FIG. 11A2 is a top-end-view schematic block diagram of an optical-gain-fiber system 1101, according to some embodiments of the invention.

FIG. 11A3 is a top-end-view schematic block diagram of an optical-gain-fiber system 1103, according to some embodiments of the invention.

FIG. 11B is a perspective-view diagram of fiber-management-and-cooling apparatus 1110, according to some embodiments of the invention.

FIG. 11C is a top-end-view diagram of fiber-management-and-cooling apparatus 1110, according to some embodiments of the invention.

FIG. 11D1 is a side-view diagram of fiber-management-and-cooling apparatus 1110', according to some embodiments of the invention.

FIG. 11D2 is a side-view diagram of fiber-management-and-cooling apparatus 1110", according to some embodiments of the invention.

FIG. 11D3 is a side-view diagram of fiber-management-and-cooling apparatus 1110''', according to some embodiments of the invention.

FIG. 11E is a side-view diagram of a single stacking unit 1105 of a fiber-management-and-cooling apparatus, according to some embodiments of the invention.

FIG. 11F is a top-end-view diagram of a single-piece split-ring fiber-management-and-cooling apparatus 1106, according to some embodiments of the invention.

FIG. 11G is a top-end-view diagram of a two-piece-ring fiber-management-and-cooling apparatus 1107, according to some embodiments of the invention.

FIG. 11H is a top-end-view diagram of an oblong fiber-management-and-cooling apparatus 1108, according to some embodiments of the invention.

FIG. 12A1 is a perspective diagram of guiding-and-cooling element 1201, according to some embodiments of the invention.

FIG. 12B1 is a top-end-view diagram of guiding-and-cooling element 1201, according to some embodiments of the invention.

FIG. 12C1 is a side-view diagram of guiding-and-cooling element 1201, according to some embodiments of the invention.

FIG. 12A2 is a perspective diagram of a guiding-and-cooling element 1201', according to some embodiments of the invention.

FIG. 12B2 is a top-end-view diagram of guiding-and-cooling element 1201'.

FIG. 12C2 is a side-view diagram of guiding-and-cooling element 1201'.

FIG. 13A is a side-view diagram, partially in cross section, of a single stacking of a fiber-management-and-cooling apparatus 1301 having an integrated tube thereon, according to some embodiments of the invention.

FIG. 13B is a side-view diagram, partially in cross section, of a fiber-management-and-cooling apparatus 1302 having an integrated tube thereon and including a plurality of stacking units 401, according to some embodiments of the invention.

FIG. 13C is a side-view diagram, partially in cross section, of a fiber-management-and-cooling apparatus 1303 formed from a single cylinder and having an integrated tube thereon, according to some embodiments of the invention.

DETAILED DESCRIPTION OF THE INVENTION

Figure 4:
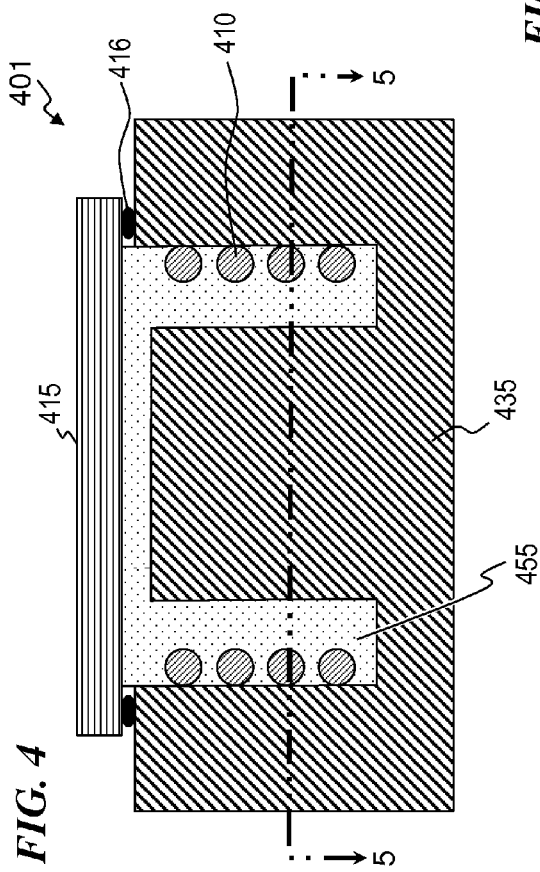
FIG. 4 is a cross-sectional side view of an optical-fiber packaging/cooling system 401.

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Note that FIGS. 1A-1C and FIGS. 2-7 are depicted for clarity of explanation and are not to scale or proportion, but show a much-enlarged fiber diameter that is not in proportion relative to the rest of the figure. In some embodiments, the fiber diameter is less than 0.1 cm, while the diameter of the center mandrels 130 and 230 is in a range of about 5 cm to about 50 cm or more. In some embodiments, the height of the center mandrels 130 and 230 is in a range of about 1 cm to about 50 cm or more.

FIG. 1A is a cross-sectional side view of a conventional (prior-art) optical-fiber packaging/cooling system 101 such as described in U.S. patent application Ser. No. 12/953,292, which is incorporated herein by reference. System 101 includes an outer hollow mandrel 120 and an inner mandrel 130 located within the hollow inner volume of outer mandrel 120. An optical fiber 110 is coiled around the inner surface of outer mandrel 120 by guiding optical fiber 110 into grooves 125 located on the inner surface of outer mandrel 120. In some embodiments of conventional system 101, thermal grease is applied to the surface optical fiber 110 and/or the inner surface of outer mandrel 120 in an attempt to increase the thermal conductivity of the interface between optical fiber 110 and outer mandrel 120 (the thermal grease, which has a greater thermal conductivity than air, fills microscopic air-gaps present due to the imperfectly flat and smooth surfaces of the component surfaces and thus increases thermal conductivity of the interface). Although thermal grease has a greater thermal conductivity than air, the thermal conductivity of thermal grease is also generally far less than the thermal conductivity of metals and other materials.

FIG. 1B is a cross-sectional top view of conventional (prior-art) system 101.

FIG. 1C is a magnified portion 101-A of the cross-sectional side view shown in FIG. 1A. Conventional system 101 utilizes a direct and continuous line contact between optical fiber 110 and the inner surface of outer mandrel 120 (see, e.g., the contact between fiber 110 and groove 125 in magnified portion 101-A) to transfer heat away from optical fiber 110 and into outer mandrel 120 during normal active operation of optical fiber 110. This approach causes three main problems that limit the maximum power available for high-power laser amplifiers using optical fiber 110:

a. The fiber temperature gets too high (i.e., not enough heat is removed);
  b. The radial temperature gradient of the fiber cross section is not uniform (e.g., during normal active operation of optical fiber 110, the temperature is warmer away from the inner surface of outer mandrel 120); and
  c. Thermal fatigue stress (i.e., the difference in the coefficient of thermal expansion between the optical fiber and the inner surface of outer mandrel 120 causes optical fiber 110 to be stressed as temperature changes).

In some embodiments, the present invention addresses the three problems set forth above by utilizing point contacts between the optical fiber and the surface of the housing (e.g., a mandrel) to allow for the optical fiber to expand and/or contract independently from the surface of the housing, and by utilizing a thermal-management material that surrounds the optical fiber and undergoes a phase change during normal active operation of the optical fiber system.

In some embodiments, the present invention provides a phase-change-based thermal-management solution that controls the gain fiber's maximum temperature, temperature uniformity of the cross-section, and minimizes thermal stress induced in the fiber. In some embodiments, this approach can handle extremely high power (e.g., in some embodiments, at least 100 W continuous power (or pulsed power equivalent to these amounts of continuous power), and in other embodiments, at least 1 kW or even 10 kW or more continuous power (or pulsed power equivalent to these amounts of continuous power)) because it includes a self-contained heat pipe (or thermal chamber) and all critical components of the fiber power amplifier can be immersed in the bath of phase-changing material. In some embodiments, the present invention is adapted for other high-power cooling needs such as the pump-diode cooling. In some embodiments, the present invention is used for conventional vertical "spiral up" fiber mandrels. In some embodiments, the present invention is used for flat "spiral out" discs. In some embodiments, the entire fiber-laser module, including electronics, is encapsulated inside a thermal chamber, which reduces the volume and weight of the fiber-laser module (see, e.g., FIG. 5).

In some embodiments, the "phase-changing material" changes from a solid state (which is usually the state of the material when the device is off or in stand-by mode at normal room temperature (about 25° C. or about 298 Kelvin) to a liquid state or at least partially liquid state when the device is fully or partially active (i.e., when the gain fiber is being optically pumped). In other embodiments, the phase-change material is liquid at normal room temperature of about 25° C. or about 298 Kelvin (but would solidify at lower temperatures) and remains a liquid even when the device is fully or partially active (i.e., when the gain fiber is being optically pumped). In yet other embodiments, the phase-change material is a solid or liquid at normal room temperature of about 25° C. or about 298 Kelvin (but would solidify at lower temperatures if not solid at room temperature) and at least partially changes to a gas when the device is fully or mostly active (i.e., when the gain fiber is being optically pumped). In some embodiments, the gas phase of such phase-change material is conveyed in a heat pipe to a location away from the gain fiber, where it is cooled and changed back to a liquid that is conveyed again to the gain fiber (e.g., by wicking or pumping the liquefied material from the cooling site to the active gain fiber). As used herein, the term "thermal-management material" or "phase-changing material" (PCM) is intended to include all such materials.

In some embodiments, the present invention is implemented as part of the systems and methods described in U.S. Pat. No. 7,391,561 issued Jun. 24, 2008, by Fabio Di Teodoro et al., titled "FIBER-OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD"; U.S. Pat. No. 7,199,924 issued Apr. 3, 2007, by Andrew J. W. Brown et al., titled "APPARATUS AND METHOD FOR SPECTRAL-BEAM COMBINING OF HIGH-POWER FIBER LASERS"; and/or U.S. Patent Application Publication No. 2011/0122482 published May 26, 2011 (which issued as U.S. Pat. No. 8,441,718 on May 14, 2013), by Roy D. Mead, titled "SPECTRALLY BEAM COMBINED LASER SYSTEM AND METHOD AT EYE-SAFER WAVELENGTHS", each of which is incorporated herein by reference.

FIG. 2 is a cross-sectional side view of an optical-fiber packaging/cooling system 201. In some embodiments, system 201 includes an outer housing 220, an inner housing 230 located within a hollow inner volume of outer housing 220, and a plurality of fiber-support members 240 (in some embodiments, as illustrated in FIG. 2A, three fiber-support members). In some embodiments, an optical fiber 210 is coiled around the inner volume of outer housing 220 such that each one of the plurality of fiber-support members 240 makes a plurality of point contacts with optical fiber 210. In some embodiments, the point contacts eliminate or minimize the fatigue stress caused by thermal cycle because the point contacts provide a kinematic interface between optical fiber 210 and the surface of fiber-support members 240 (e.g., a metal surface), which therefore allows optical fiber 210 and the surface of fiber-support members 240 to expand and/or contract independently. In some embodiments, each of the plurality of fiber-support members 240 has a plurality of grooves or notches that each provide a small area of contact (what is denoted herein as a "point contact") as well as each defining a rest position of the optical fiber's contact for that loop of optical fiber within optical-fiber packaging/cooling system 201. In some embodiments, each small area of contact is not more than 0.1 cm (100 microns) long and 0.05 cm (50 microns) high. In other embodiments, smaller or slightly larger areas of contact are used for each point contact between one loop of the optical fiber and the corresponding notch or grove in the support member.

In some embodiments, the space between outer housing 220 and inner housing 230 where optical fiber 210 is located is filled with a thermal-management material 250. In some embodiments, thermal-management material 250 is a phase-changing material (PCM), such as low-temperature solder having a melt temperature that is slightly higher than the maximum ambient temperature of system 201 (in some embodiments, a low-temperature solder has greater thermal conductivity than any polymer-based thermal compound). In some embodiments, PCM 250 is a thermal-management liquid having a boiling temperature that is slightly higher than maximum ambient temperature of system 201. Selecting PCM 250 with a phase-change temperature that is slightly higher than ambient ensures that the phase change does not occur when the system is off (i.e., not in operation). In some embodiments, upon operation, when optical fiber 210 reaches the phase-change temperature of PCM 250, the phase-change material 250 will change phase and either carry the heat away by vaporization (in some embodiments, the vaporized PCM 250 then condenses on a nearby colder metal surface), or conduct heat away to a nearby metal surface. In some embodiments, PCM 250 also minimizes or eliminates any stress related to the cooling path.

FIG. 3 is a cross-sectional top view of system 201. In some embodiments, system 201 controls the temperature of optical fiber 210 at the phase-change point of PCM 250. In some embodiments, system 201 maintains or substantially maintains temperature uniformity across the radial cross-section of optical fiber 210 by using PCM 250 to create an internal heat-pipe effect (e.g., in some embodiments, PCM 250 changes phase to a gas during normal active operation of system 201 and the vaporized PCM 250 carries heat away from optical fiber 210, and then condenses on a nearby colder surface such as the surface of fiber-support member 240). In some embodiments, PCM 250 is a high-conductivity low-temperature solder. In some embodiments, system 201 provides a kinematic or pseudo-kinematic interface between optical fiber 210 and the surface of fiber-support members 240 that eliminates or substantially eliminates thermal stress caused by the difference in the coefficient of thermal expansion between optical fiber 210 and the inner surface of outer mandrel 220.

In some embodiments, fiber-support members 240 include round metal posts. In some embodiments, fiber-support members 240 include round metal posts that are configured to hold optical fiber 210 in chiller water contained within the inner volume of outer housing 220. In some embodiments, thermal-management material 250 is a thermal grease such as white ice (e.g., White Ice 514 supplied by timtronics.com).

In some embodiments, system 201 includes three fiber-support members 240, each of which includes a plurality of curve-to-curve point contacts between optical fiber 210 and the surface of the respective fiber-support member 240. The curve-to-curve point contacts create a kinematic or pseudo-kinematic interface between optical fiber 210 and fiber-support members 240 that minimizes thermal stress.

In some embodiments, thermal-management material 250 is a low-temperature solder (e.g., alloy $Bi_{49}In_{21}Pb_{18}Sn_{12}$ such as provided by www.Coininginc.com) (see, e.g., FIG. 3B). In some embodiments, solder 250 is solid when system 201 is not operational, thus optical fiber 210 is secured in place when system 201 is not in active operation. In some embodiments, once system 201 is operational (e.g., the laser is turned on), only solder 250 that is touching optical fiber 210 will melt, eliminating (or substantially eliminating) any stress and still maintaining high thermal conductivity.

In some embodiments, thermal-management material 250 is a thermal-management liquid (e.g., 3M™ Fluorinert™ Electronic Liquid FC-72) that has a boiling temperature slightly above the operating ambient temperature of system 201. In some embodiments, the temperature and uniformity of temperature radially across optical fiber 210 is maintained at the boiling temperature because the liquid 250 evaporates to condense on nearby metal (that is cooled to below boiling temperature) and the void will be filled instantly by surrounding liquid 250.

Figure 8:
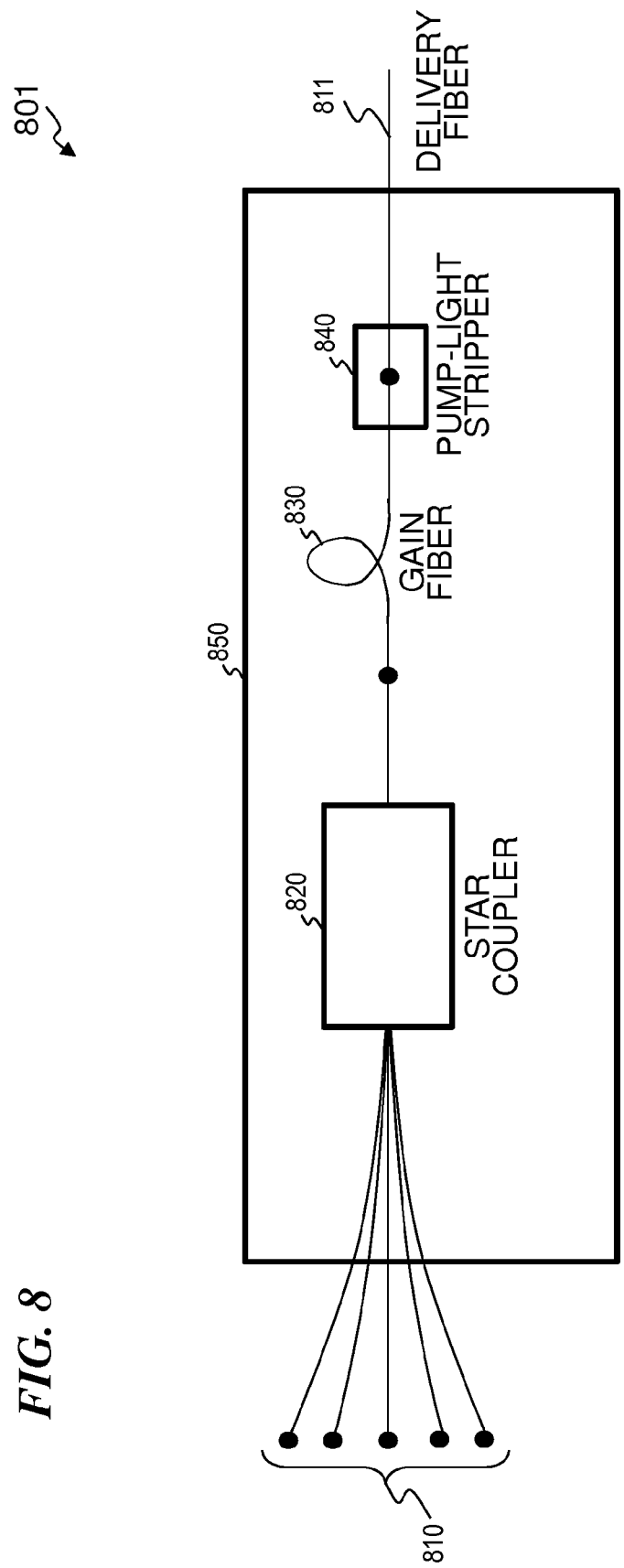
FIG. 8 is a schematic diagram of a fiber amplifier packaging/cooling system 801.

In some embodiments, liquid 250 is sealed in a cavity that includes optical fiber 210 (e.g., a gain fiber), a star coupler, and a pump stripper such that the optical fiber 210, star coupler, and pump stripper, are all immersed in liquid 250 (see, e.g., FIG. 8).

FIG. 4 is a cross-sectional side view of an optical-fiber packaging/cooling system 401. In some embodiments, system 401 includes a gain-fiber host 435 that has an outer portion and an inner portion that are separated from each other by a gain-fiber cavity 455. In some embodiments, system 401 includes a lid 415 that has an o-ring seal 416.

Figure 5:
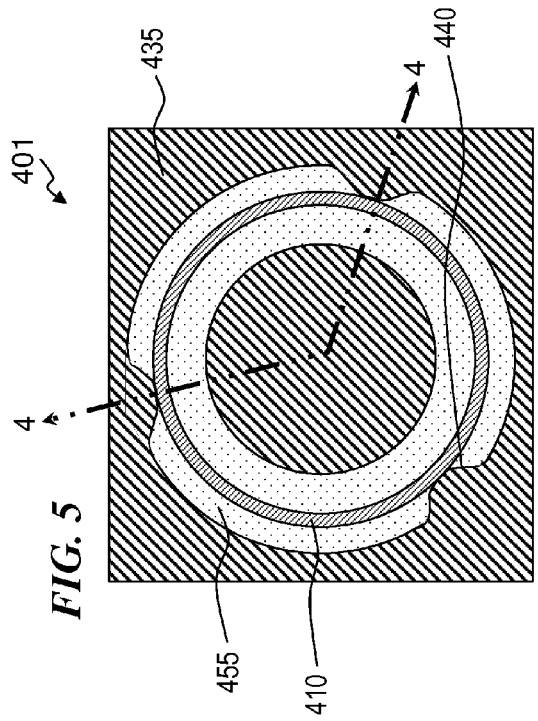
FIG. 5 is a cross-sectional top view of optical-fiber packaging/cooling system 401.

FIG. 5 is a cross-sectional top view of optical-fiber packaging/cooling system 401. In some embodiments, as shown in FIG. 4 and FIG. 5, the outer portion and inner portion of gain-fiber host 435 are made from a single piece of material. In some embodiments, system 401 includes a plurality of fiber-support members 440 that are machined into the inner wall of the outer portion of gain-fiber host 435. In some embodiments, an optical fiber 410 is coiled around the inner portion of gain-fiber host 435 such that each one of the plurality of fiber-support members 440 makes a plurality of point contacts with optical fiber 410. In some embodiments, the point contacts eliminate or minimize the fatigue stress caused by thermal cycle because the point contacts provide a kinematic interface between optical fiber 410 and the surface of fiber-support members 440 (e.g., a metal surface), which therefore allows optical fiber 410 and the surface of fiber-support members 440 to expand and/or contract independently. In some embodiments, each of the plurality of fiber-support members 440 has a plurality of grooves or notches that each provide a small area of contact (what is denoted herein as a "point contact") as well as each defining a rest position of the optical fiber's contact for that loop of optical fiber within optical-fiber packaging/cooling system 401. In some embodiments, each small area of contact is not more than 0.1 cm (100 microns) long and 0.05 cm (50 microns) high. In other embodiments, smaller or slightly larger areas of contact are used for each point contact between one loop of the optical fiber and the corresponding notch or grove in the support member. In some embodiments, gain-fiber cavity 455 is filled with a high-temperature solder. In some embodiments, gain-fiber cavity 455 is filled with a thermal-management liquid.

Figure 6:
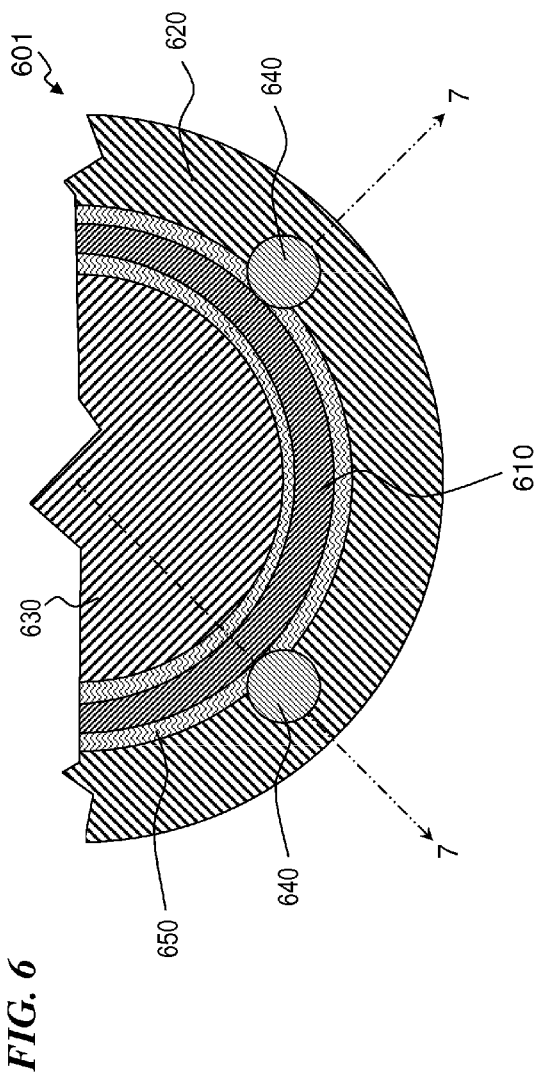
FIG. 6 is a cross-sectional top view of an optical-fiber packaging/cooling system 601.

FIG. 6 is a cross-sectional top view of an optical-fiber packaging/cooling system 601. In some embodiments, system 601 includes an outer housing 620, an inner housing 630 located within a hollow inner volume of outer housing 620, and a plurality of fiber-support members 640. In some embodiments, an optical fiber 610 is coiled around the inner volume of outer housing 620 such that each one of the plurality of fiber-support members 640 makes a plurality of point contacts with optical fiber 610. In some embodiments, the point contacts eliminate or minimize the fatigue stress caused by thermal cycle because the point contacts provide a kinematic interface between optical fiber 610 and the surface of fiber-support members 640 (e.g., a metal surface), which therefore allows optical fiber 610 and the surface of fiber-support members 640 to expand and/or contract independently. In some embodiments, the space between outer housing 620 and inner housing 630 where optical fiber 610 is located is filled with a thermal-management material 650. In some embodiments, thermal-management material 650 is a phase-changing material (PCM), such as low-temperature solder having a melt temperature that is slightly higher than the maximum ambient temperature of system 601 (in some embodiments, a low-temperature solder has greater thermal conductivity than any polymer-based thermal compound). In some embodiments, PCM 650 is a thermal-management liquid having a boiling temperature that is slightly higher than maximum ambient temperature of system 601.

Figure 7:
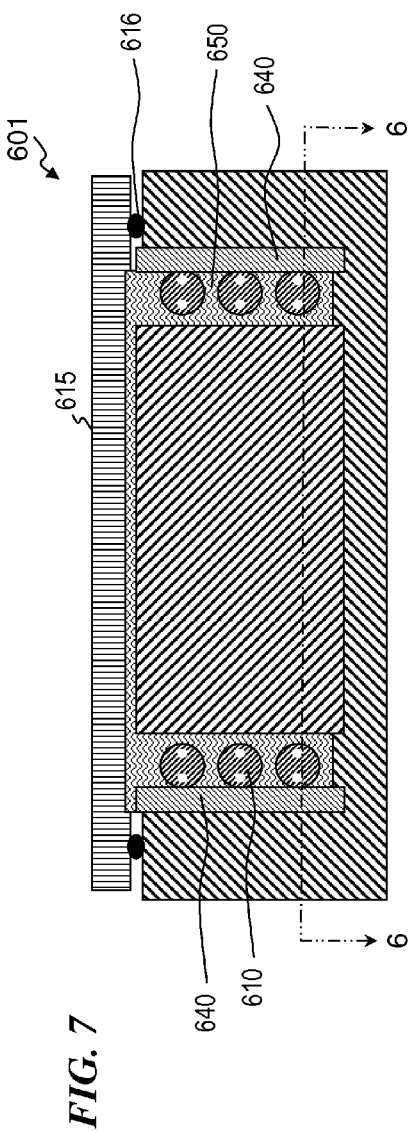
FIG. 7 is a cross-sectional side view of optical-fiber packaging/cooling system 601.

FIG. 7 is a cross-sectional side view of optical-fiber packaging/cooling system 601. In some embodiments, system 601 includes a lid 615 that has an o-ring seal 616.

FIG. 8 is a schematic diagram of a fiber amplifier packaging/cooling system 801. In some embodiments, system 801 includes a plurality of input fibers 810 that are operatively coupled to a star coupler 820. In some embodiments, input fibers 810 include at least one input fiber carrying a signal beam and at least one input fiber carrying a pump beam. In some embodiments, the pump and signal beams from the plurality of input fibers 810 are coupled together by the star coupler 820 to form a combined-pump-and-signal beam, and the combined-pump-and-signal beam exits star coupler 820 and passes into a gain fiber 830. In some embodiments, gain fiber 830 amplifies the combined-pump-and-signal beam to form an amplified combined-pump-and-signal beam. In some embodiments, gain fiber 830 is coupled to a pump-light stripper 840 that is configured to strip the pump beam(s) away from the amplified combined-pump-and-signal beam to form an output beam. In some embodiments, the output beam is outputted from system 801 via a delivery fiber 811. In some embodiments, a housing 850 encloses star coupler 820, gain fiber 830, pump-light stripper 840, and at least a portion of the plurality of input fibers 810 and the delivery fiber 811. In some such embodiments, housing 850 is filled with a thermal-management material such that the components inside housing 850 are sealed in the thermal-management material. In some embodiments, the thermal-management material is a thermal-management liquid (e.g., 3M™ Fluorinert™ Electronic Liquid FC-72) that has a boiling temperature slightly above the operating ambient temperature of system 801.

Figure 9:
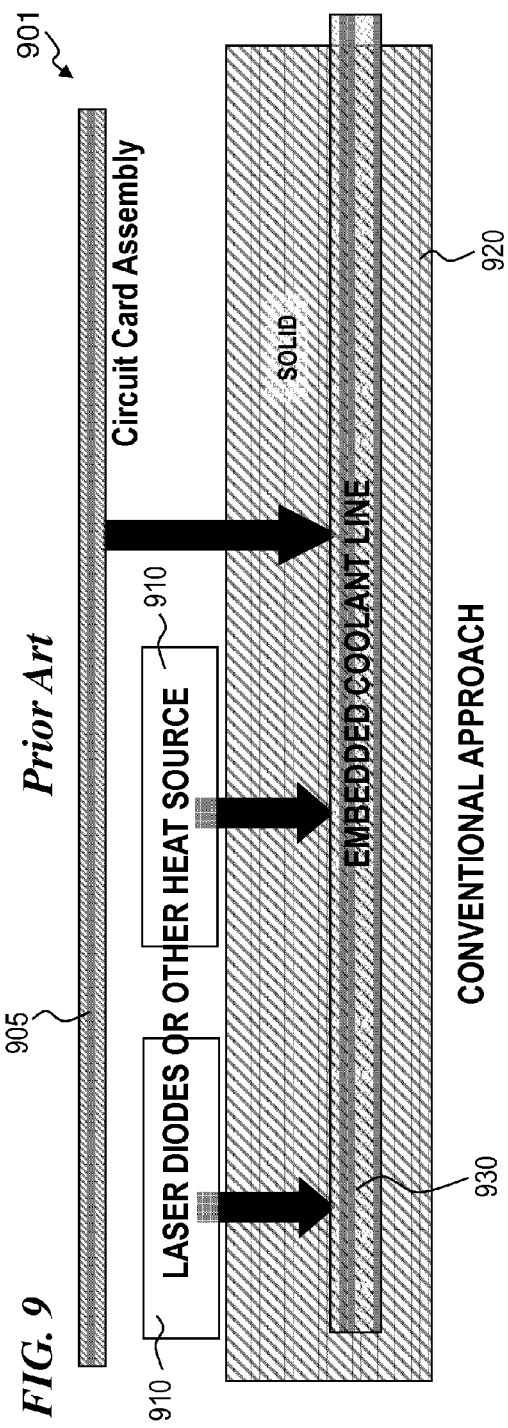
FIG. 9 is a schematic diagram (cross-section elevational view) of a conventional (prior-art) gain fiber cooling system 901.

FIG. 9 is a schematic diagram of a conventional (prior-art) gain fiber cooling system 901. System 901 includes a circuit-card assembly (CCA) 905 and laser diodes or other heat sources 910 that are in contact with a solid base 920. In some embodiments, base 920 includes an embedded coolant line 930. As shown in FIG. 9, heat from the diode/heat source follows a conduction heat path that runs from the diode/heat source 910 and/or the CCA 905 through base 920 and to the embedded coolant line 930.

Figure 10A:
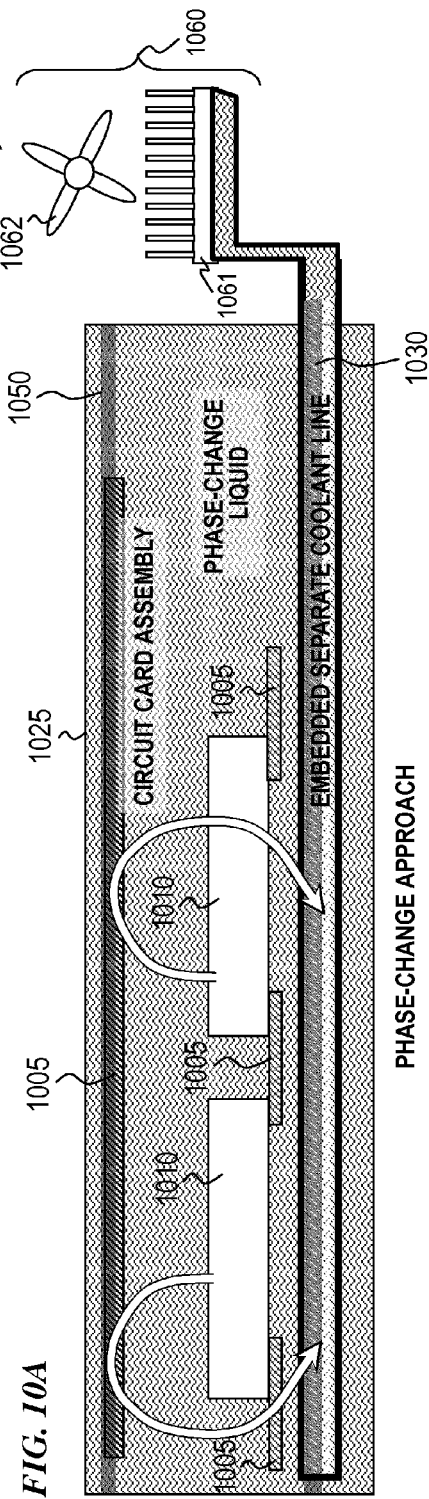
FIG. 10A is a schematic (cross-section elevational view) diagram of a gain fiber cooling system 1001.

FIG. 10A is a schematic diagram of a gain fiber cooling system 1001. In some embodiments, system 1001 includes a circuit-card assembly (CCA) 1005 and laser diodes or other heat sources 1010 that are mounted on a fiber-laser module (FLM) skeleton 1005. In some embodiments, CCA 1005, heat sources 1010, and skeleton 1005 are encapsulated in a thermal chamber 1025 that is filled with a thermal-management material 1050 (e.g., in some embodiments, a thermal-management liquid (e.g., 3M™ Fluorinert™ Electronic Liquid FC-72) that has a boiling temperature slightly above the operating ambient temperature of system 1001). In some embodiments, FLM skeleton 1005 is a structural "spider" that holds in the specified shape, while allowing convective circulation of the thermal-management material 1050. In some embodiments, thermal chamber 1020 includes an embedded separate coolant line 1030 that pulls in heat from heat sources 1010 and/or CCA 1005 via thermal-management material 1050. In some embodiments, coolant line 1030 exits thermal chamber 1020 and connects to a condenser portion 1060 that removes heat from system 1001. In some embodiments, condenser portion 1060 includes a heat sink 1061 and a fan 1062.

FIG. 10B is a schematic diagram of a gain-fiber cooling system 1002. In some embodiments, system 1002 is substantially similar to system 1001 except that there is no embedded separate coolant line 1030 that exits chamber 1025 and connects to condenser portion 1060. Instead, in some embodiments, condenser portion 1060 is operatively coupled directly to chamber 1025.

FIG. 10C is a schematic diagram of a gain-fiber cooling system 1003. In some embodiments, system 1003 is substantially similar to system 1001 except that there is no embedded separate coolant line 1030. Instead, in some embodiments, thermal-management material 1050 carries heat out of chamber 1050 through an exit conduit 1063 that connects to condenser portion 1060.

FIG. 11A1 is a side-view schematic block diagram of an optical-gain-fiber system 1101, according to some embodiments of the invention. In some embodiments, guiding-and-cooling element 1110 is encapsulated within a chamber 1110.1 that is filled with a thermal-management material (e.g., a phase-change material such as 3M™ Fluorinert™ Electronic Liquid FC-72) such that element 1110 is immersed in the phase-change material.

FIG. 11A2 is an end-view schematic block diagram of optical-gain-fiber system 1101, according to some embodiments of the invention. In some embodiments such as system 1101 shown in FIG. 1A1 and FIG. 1A2, the signal light travels in a direction in the gain fiber such that the signal starts along the inner surface and after being amplified there travels in the gain fiber along the outer surface where it is further amplified. In some such embodiments, the pump light travels in a counter-propagating direction such that the highest power pump light and the highest power signal are located in the gain fiber 98 on the outer surface of guiding-and-cooling element 1110 (equivalently, also called the optical-fiber-contact body 1110). In some embodiments, the outer surface provides a greater surface area and thus provides a larger heat sink for the high power end of the gain fiber 98.

FIG. 11A3 is an end-view schematic block diagram of an optical-gain-fiber system 1103, according to some embodiments of the invention. In some such embodiments, an air movement device, such as a fan 180, is provided to push or pull air through the center of guiding-and-cooling element 1110 in order to improve cooling of that higher-power section of gain fiber 98.

Referring again to FIG. 11A1 and FIG. 11A2, in some embodiments, fiber-cable cooling-and-management system 1101 includes an optical seed source 91 (such as a seed laser or narrow-band wavelength-filtered ASE source such as described in U.S. Pat. No. 7,701,987 titled "APPARATUS AND METHOD FOR GENERATING CHIRP-SLICE CONTROLLED-LINEWIDTH LASER-SEED SIGNALS," issued Apr. 20, 2010 to Matthias P. Savage-Leuchs et al., which is incorporated herein by reference). In some embodiments, the seed signal (i.e., light having a signal wavelength (the nominal central wavelength), and a linewidth) from source 91 is pre-amplified by an optical preamp 92, and the pre-amplified output light signal is optically coupled into gain fiber 98 (e.g., in some embodiments, an optical fiber having a core that is doped with a rare-earth dopant such as ytterbium, thulium, dysprosium, praseodymium, neodymium, samarium, europium, gadolinium, terbium, holmium, erbium, and/or other suitable dopant), and gain fiber 98 is optically coupled to output fiber 99. In some embodiments, the optical gain fiber 98 has multiple cladding layers including a pump cladding adjacent to the core that provides pump light that enters the core along its length, and an outer cladding that keeps the pump light confined within the outer diameter of the pump cladding. In some embodiments, pump light is launched into gain fiber 98 at one or both ends (when pump light is introduced by pump 97 at the left-hand end (relative to FIG. 11A1 and FIG. 11A2) and the pump light travels the same direction as the signal in the core, it is called co-propagating light, while when pump light is introduced by pump 97' at the right-hand end (relative to FIG. 11A1 and FIG. 11A2) and traveling in the opposite direction as the signal in the core, it is called counter-propagating light). When large amounts of pump light are used, there is a need to cool fiber 98, and thus the fiber is placed in intimate contact with guiding-and-cooling element 1110, both along the inner surface of guiding-and-cooling element 1110 and along its outer surface. The present invention also provides improved methods for loading and holding the fiber 98 against the surfaces of the guiding-and-cooling element 1110.

In some embodiments, system 1103 does not have a fan 180 and light source 91, preamp 92, pump 97, guiding-and-cooling element 1110, and pump 97' are all contained within a chamber 1110.1 that is filled with a thermal-management material (e.g., a phase-change material such as 3M™ Fluorinert™ Electronic Liquid FC-72) such that light source 91, preamp 92, pump 97, guiding-and-cooling element 1110, and pump 97' are all immersed in the phase-change material.

FIG. 11B is a perspective view of guiding-and-cooling element 110 shown as part of system 1101 in FIG. 11A1 and FIG. 11A2, and system 1103 of FIG. 11A3, according to some embodiments of the invention.

FIG. 11C is an end-view block diagram of guiding-and-cooling element 1110, according to some embodiments of the invention.

FIG. 11D1 is a side-view diagram of fiber-management-and-cooling apparatus 1110', according to some embodiments of the invention, that has its heat sink 183 attached to an end of cylinder 112.

FIG. 11D2 is an end-view diagram of a fiber-management-and-cooling apparatus 110", according to some embodiments of the invention, that has its heat sink 181 attached to the outer surface 111 of cylinder 112.

FIG. 11D3 is a top-end-view diagram of a fiber-management-and-cooling apparatus 1110''', according to some embodiments of the invention, that has its heat sink 182 attached to inner surface 117 of cylinder 112. In some embodiments, a fan 180 is also provided to move air across inner heat sink 182.

FIG. 11E is a side-view block diagram of a single stacking unit 1105 (also described herein as an "optical-fiber-contact section") of fiber-management-and-cooling apparatus 1110, according to some embodiments of the invention. In some embodiments, a plurality of stacking units 1105 form building blocks that can be used singly or in two or more stacked groups to form fiber-management-and-cooling apparatus 1110. In some embodiments, the number of stacking units 1105 used to form guiding-and-cooling element 1110 is determined by the length of the optical fiber 98 that requires cooling and management.

FIG. 11F is an end-view diagram of a single-piece split-ring fiber-management-and-cooling apparatus 1106, according to some embodiments of the invention. In some embodiments, apparatus 106 includes a generally cylindrical body 112' that can be used in place of cylinder 112 in system 1101, but (unlike cylinder 112 described above) body 112' has a slot 190, which, in some embodiments, eases fabrication or assembly of system 1101. In some embodiments, slot 190 helps compensate for thermal expansion and contraction of cylindrical body 112' and the optical fiber 98 by allowing the ring to flex and the outer circumference to expand and contract.

FIG. 11G is an end-view diagram of a two-piece-ring fiber-management-and-cooling apparatus 1107, according to some embodiments of the invention. In some embodiments, apparatus 1107 includes a generally cylindrical body 112" formed from a plurality of sections (in this case, sections 112A and 112B, each forming an approximately 180-degree portion) that can be used in place of cylinder 112 in system 1101, but (unlike cylinder 112 described above) body 112" has a plurality of joints 191, which, in some embodiments, eases fabrication or assembly of system 1101. In other embodiments, body 112" is formed using a larger number of sections, and/or differently sized portions.

FIG. 11H is an end-view diagram of an oblong fiber-management-and-cooling apparatus 1108, according to some embodiments of the invention. In some embodiments, apparatus 1108 includes a generally oblong body 112''' (or other body having a curved form with an inner surface and an outer surface) that can be used in place of cylinder 112 in system 1101, but (unlike cylinder 112 described above) body 112''' has extended-length flattened center portion 192 on each of one or more sides (in the embodiment shown on two sides, but in other embodiments, on one side or three or more sides), which, in some embodiments, facilitates achieving a particular footprint or shape of system 1101.

FIG. 12A1 is a perspective view of guiding-and-cooling element 1201, according to some embodiments of the invention.

FIG. 12B1 is an end-view block diagram of guiding-and-cooling element 1201.

FIG. 12C1 is a side-view block diagram of guiding-and-cooling element 1201. In some embodiments, guiding-and-cooling element 201 is configured to manage and cool an optical fiber and is substantially similar to guiding-and-cooling element 1110, except that guiding-and-cooling element 1201 does not have a continuous inner groove as guiding-and-cooling element 1110 does. Rather, in some embodiments, guiding-and-cooling element 1201 includes a plurality of protruding fiber guides 241 that are configured to direct and guide an optical fiber that is looped or coiled around the inner-facing surface 217 and to manage the successive loops of the optical fiber.

FIG. 12A2 is a perspective diagram of a guiding-and-cooling element 1201', according to some embodiments of the invention.

FIG. 12B2 is an end-view diagram of guiding-and-cooling element 1201'.

FIG. 12C2 is a side-view diagram of guiding-and-cooling element 1201'. Note that guiding-and-cooling element 1201' is substantially similar to guiding-and-cooling element 1201 once the four removable and insertable grooved elements 242 are loaded into slots 243.

FIG. 13A is a side-view block diagram, partially in cross section, of single stacking unit 1301 of a guiding-and-cooling element having an integrated tube thereon, according to some embodiments of the invention. In some embodiments, a plurality of stacking units 1301 can be stacked together to form a cylinder 1302 as shown in FIG. 13B (in a manner similar to stacking a plurality of stacking units 1105 (of FIG. 1E) to form a cylinder 1110' (as shown in FIG. 11D1)).

FIG. 13B is a side-view block diagram, partially in cross section, of a guiding-and-cooling element 1302 being formed from a plurality of identical stacking units 1312' sandwiched end-to-end between a first transitional stacking-unit end 1312" and a second transitional stacking-unit end 1312''', according to some embodiments of the invention.

FIG. 13C is a side-view block diagram, partially in cross section, of a guiding-and-cooling element 1303 formed from a single heat-sink cylinder and having an integrated tube thereon, according to some embodiments of the invention. In some embodiments, guiding-and-cooling element 1303 is substantially similar to guiding-and-cooling element 1302 described above in FIG. 13B, except that guiding-and-cooling element 1303 is formed from a single heat-conducting cylinder 312 with a single continuous inner tube 351 and a single continuous outer tube 352 instead of being formed by a plurality of stacking units as described for guiding-and-cooling element 1302. In other embodiments, a single cylinder is used, but a plurality of tubes is used on the inner and/or outer surface.

In some embodiments, the present invention is beneficial for defense industry uses, industrial uses, and medical uses, and the like, that use and benefit by employing fiber lasers, including high-power fiber lasers and laser systems. In some embodiments, the present invention is configured for use in fiber laser systems for solar-panel machining, surgery or other medical therapy (such as, for example, BPH (benign prostatic hypertrophy) medical treatment), high-power fiber-laser weaponry, laser materials processing, laser welding or cutting, and the like.

In some embodiments, the present invention provides an optical-fiber temperature-management system that includes an optical fiber; a temperature-management device configured to remove excess heat from the optical fiber, the temperature-management device including: a first hollow cylinder having a first outer diameter and a first inner diameter, wherein the optical fiber is configured to be coiled around the first inner diameter of the first hollow cylinder, and one or more elongated members coupled to the first hollow cylinder, wherein at least a portion of each of the one or more elongated members is located between the first inner diameter of the first hollow cylinder and the optical fiber such that each of the one or more elongated members provides one or more point contacts with the optical fiber.

In some embodiments of the system, the temperature-management device further includes a second cylinder having a second outer diameter, wherein the second outer diameter is smaller than the first inner diameter of the first hollow cylinder, wherein the second cylinder is located within the first hollow cylinder such that a channel is formed between the first inner diameter of the first hollow cylinder and the second outer diameter of the second cylinder.

In some embodiments, the channel between the first inner diameter of the first hollow cylinder and the second outer diameter of the second cylinder contains a thermal-management material. In some embodiments, the channel has an ambient temperature when the system is not in operation, wherein the channel contains a thermal-management material, and wherein the thermal-management material is a liquid at the ambient temperature. In some embodiments, the channel has an ambient temperature when the system is not in operation, wherein the channel contains a thermal-management material, and wherein the thermal-management material is a solid at the ambient temperature. In some embodiments, the channel has an ambient temperature when the system is not in operation and the channel has an operational temperature when the system is in operation, wherein the channel contains a thermal-management material, and wherein the thermal-management material is a solid at the ambient temperature and a liquid at the operational temperature. In some embodiments, the channel has an ambient temperature when the system is not in operation and the channel has an operational temperature when the system is in operation, wherein the channel contains a thermal-management material, and wherein the thermal-management material is a solid at the ambient temperature and a liquid at the operational temperature, the system further including a heat element located within the channel, wherein the heat element is configured to pre-heat the thermal-management material such that the operational temperature of the channel is reached prior to operation of the system.

In some embodiments of the system, the first hollow cylinder includes a hollow portion, wherein the hollow portion contains a thermal-management material.

In some embodiments of the system, the one or more elongated members is a single elongated member. In some embodiments, the one or more elongated members includes one or more rods. In some embodiments, the one or more elongated members includes one or more bars. In some embodiments, the one or more elongated members includes a first elongated member, wherein a longitudinal axis of the first elongated member is substantially parallel to a longitudinal axis of the first hollow cylinder. In some embodiments, the one or more elongated members includes a first elongated member, wherein the first elongated member has a first length value, wherein the first hollow cylinder has a first height value, and wherein the first length value of the first elongated member is substantially equivalent to the first height value of the first hollow cylinder.

In some embodiments, the one or more elongated members includes a first elongated member, and wherein the first elongated member includes one or more grooves configured to guide the optical fiber around the first inner diameter of the first hollow cylinder. In some embodiments, the one or more elongated members includes a first elongated member, wherein the first elongated member includes one or more grooves configured to guide the optical fiber around the first inner diameter of the first hollow cylinder, and wherein a surface of the first inner diameter of the first hollow cylinder includes grooves configured to guide the optical fiber around the first inner diameter of the first hollow cylinder. In some embodiments, the one or more elongated members includes a first elongated member, wherein the first elongated member includes one or more grooves configured to guide the optical fiber around the first inner diameter of the first hollow cylinder, and wherein the second outer diameter of the second cylinder includes grooves that are configured to guide the optical fiber around the channel.

In some embodiments, the present invention provides a method for removing excess heat from an optical fiber, the method including providing the optical fiber; providing a temperature-management device, wherein the temperature-management device includes a first hollow cylinder having a first outer diameter and a first inner diameter, and one or more elongated members coupled to the first hollow cylinder, wherein at least a portion of each of the one or more elongated members is located between the first inner diameter of the first hollow cylinder and the optical fiber; the method further including coiling the optical fiber around the first inner diameter of the first hollow cylinder, wherein the coiling of the optical fiber includes forming one or more point contacts between the optical fiber and the one or more elongated members.

In some embodiments of the method, the providing of the temperature-management device further includes providing a second cylinder having a second outer diameter, wherein the second outer diameter is smaller than the first inner diameter of the first hollow cylinder, wherein the second cylinder is located within the first hollow cylinder such that a channel is formed between the first inner diameter of the first hollow cylinder and the second outer diameter of the second cylinder, the method further including inserting a thermal-management material into the channel.

In some embodiments of the method, the first hollow cylinder includes a hollow portion, the method further including inserting a thermal-management material into the hollow portion of the first hollow cylinder.

In some embodiments, the present invention provides a system that includes an optical fiber; means for removing excess heat from the optical fiber, wherein the means for removing excess heat includes means for coiling the optical fiber around in a spiral, and means for forming one or more point contacts between the means for coiling and the optical fiber.

In some embodiments, the present invention provides an optical-fiber packaging system that includes an optical fiber; and a temperature-management device configured to remove excess heat from the optical fiber, the temperature-management device including: a first housing having a first outer-perimeter surface and an inner volume facing a first inner surface, wherein the inner volume has a length, a plurality of fiber-support members coupled to the first inner surface of the first housing, wherein each of the plurality of fiber-support members has a plurality of point supports arranged along the length of the inner volume, and wherein each point support is configured to provide a point contact with the optical fiber, and wherein the optical fiber follows a coiled path around the inner volume, and a thermal management material that surrounds the optical fiber except for where the optical fiber contacts the fiber-support members.

In some embodiments of the system, the thermal management material solidifies when the optical fiber is not in normal active operation, wherein the thermal management material is in a liquid state where it contacts the optical fiber when the optical fiber is in normal active operation.

In some embodiments of the system, the optical fiber, during normal operating operation, does not contact the inner surface except at the point contacts In some embodiments of the system, each of the plurality of fiber-support members is formed as a plurality of projecting teeth on the inner surface of the housing and along a line that extends from one end of the inner volume to an opposite end of the inner volume.

In some embodiments of the system, the housing comprises at least one passage between the outer-perimeter surface and the first inner surface, and wherein a coolant fluid is circulated within the at least one passage. In some embodiments, the housing comprises at least one passage between the outer-perimeter surface and the first inner surface, wherein a pre-heat fluid is circulated within the at least one passage to melt the thermal-management material to a liquid.

In some embodiments of the system, the plurality of fiber-support members each have a plurality of grooves formed therein, wherein each groove defines one of the point supports. In some embodiments, each groove is V shaped and defines two point supports. In some embodiments, the plurality of fiber-support members each have a plurality of slots formed therein, wherein each slot defines one of the point supports.

In some embodiments of the system, the housing comprises a hollow cylindrical portion. In some embodiments, a cross-section of the housing perpendicular to a length axis has a closed perimeter. In some embodiments, a cross-section of the housing perpendicular to a length axis has a circular shape except for the fiber-support members.

In some embodiments of the system, the fiber-support members are integral with the housing. In some embodiments, the fiber-support members are separable pieces held to the first inner surface.

In some embodiments, the system further includes a drum member within the inner volume of the housing. In some embodiments, a cooling fluid is circulated within the drum member. In some embodiments, a portion of the optical fiber is coiled around an outer-diameter surface of the drum member. In some embodiments, the drum member itself has a hollow interior volume and a further portion of the optical fiber is coiled around an inner-diameter surface of the drum member.

In some embodiments, the present invention provides an optical-fiber packaging system that includes an optical fiber; and a temperature-management device configured to remove excess heat from the optical fiber, the temperature-management device including: a first housing having a first outer-perimeter surface and an inner volume facing a first inner surface, wherein the inner volume has a length, a plurality of fiber-support members coupled to the first inner surface of the first housing, wherein each of the plurality of fiber-support members has a plurality of point supports arranged along the length of the inner volume, and wherein each point support is configured to provide a point contact with the optical fiber, and wherein the optical fiber follows a coiled path around the inner volume, and a thermal-management material that surrounds the optical fiber except for locations where the optical fiber contacts the plurality of fiber-support members.

In some embodiments of the system, the thermal-management material is located within the inner volume of the first housing, wherein the inner volume of the first housing has an ambient temperature when the system is not in normal active operation, wherein the inner volume has an operational temperature when the system is in normal active operation, and wherein the thermal-management material is in a solid state at the ambient temperature and in a liquid state at the operational temperature.

In some embodiments of the system, the thermal-management material is located within the inner volume of the first housing, wherein the inner volume of the first housing has an ambient temperature when the system is not in normal active operation, wherein the inner volume has an operational temperature when the system is in normal active operation, wherein the thermal-management material is in a solid state at the ambient temperature and in a liquid state at the operational temperature, wherein the first housing comprises at least one passage located between the first outer-perimeter surface and the first inner surface, and wherein the at least one passage includes a heat-exchange module configured to pre-heat the inner volume of the first housing such that the operational temperature of the inner volume is reached prior to normal active operation of the system.

In some embodiments of the system, the thermal-management material is located within the inner volume of the first housing, wherein the inner volume of the first housing has an ambient temperature when the system is not in normal active operation, wherein the inner volume has an operational temperature when the system is in normal active operation, wherein the thermal-management material is in a solid state at the ambient temperature and in a liquid state at the operational temperature, wherein the first housing comprises at least one passage located between the first outer-perimeter surface and the first inner surface, wherein the at least one passage includes a heat-exchange module configured to pre-heat the inner volume of the first housing such that the operational temperature of the inner volume is reached prior to normal active operation of the system, and wherein the heat-exchange module includes a pre-heat fluid that is circulated within the at least one passage in order to liquefy at least part of the thermal-management material before the gain fiber is pumped and/or in active operation.

In some embodiments of the system, the thermal-management material is located within the inner volume of the first housing, wherein the inner volume of the first housing has an ambient temperature (i.e., the temperature of the surrounding environment; e.g., room temperature (about 25° C. or about 298 Kelvin)) when the system is not in normal active operation, wherein the inner volume has an operational temperature when the system is in normal active operation, wherein the thermal-management material is in a solid state at the ambient temperature and in a liquid state at the operational temperature, wherein the first housing comprises at least one passage located between the first outer-perimeter surface and the first inner surface, wherein the at least one passage includes a heat-exchange module that is configured to pre-heat the inner volume of the first housing such that the operational temperature of the inner volume is reached prior to normal active operation of the system, and wherein the heat-exchange module includes a resistance heat element or other heat source that is activated before starting to pump the gain fiber in order to liquefy at least part of the thermal-management material before the gain fiber is pumped and/or in active operation. In some embodiments, this pre-heating is intended to liquefy the thermal-management material so that the gain fiber can move as it self-heats from the pump power being applied.

In some embodiments of the system, each one of the plurality of fiber-support members is formed as a plurality of projecting teeth on the first inner surface of the first housing and along a line that extends from one end of the inner volume to an opposite end of the inner volume. In some embodiments, each one of the plurality of fiber-support members is integral with the first housing. In some embodiments, each one of the plurality of fiber-support members is a separable piece held to the first inner surface of the first housing. In some embodiments, each one of the plurality of fiber-support members has a plurality of grooves formed therein, and wherein each groove defines one of the plurality of point supports. In some embodiments, each one of the plurality of fiber-support members has a plurality of grooves formed therein, and wherein each groove is V shaped and defines two point supports of the plurality of point supports. In some embodiments, each one of the plurality of fiber-support members has a plurality of slots formed therein, and wherein each slot defines one of the plurality of point supports.

In some embodiments of the system, the optical fiber, during normal (active) operation of the system (i.e., when the gain fiber is being pumped), does not contact the first inner surface of the first housing except at the point contacts. In some embodiments, a plurality of active elements (i.e., the gain fiber and one or more other heat-emitting devices) are all immersed in the thermal management material in the thermal module or housing, and each is positioned and held such that a minimum contact is made to the housing and most (i.e., more than 50%, and in some embodiments, at least 95%) of the surface area of each heat-emitting device is in contact with the thermal-management material. In some embodiments, two or more different thermal-management materials are used in contact with the heat-emitting devices.

In some embodiments of the system, the first housing includes a hollow cylindrical portion, wherein a cross-section of the first housing perpendicular to a length axis has a closed perimeter. In some embodiments, the first housing includes a hollow cylindrical portion, wherein a cross-section of the first housing perpendicular to a length axis has a circular shape except for the plurality of fiber-support members. In some embodiments, the first housing includes a hollow cylindrical portion, the system further comprising a drum member located within the inner volume of the first housing. In some embodiments, the first housing includes a hollow cylindrical portion, the system further including a drum member located within the inner volume of the first housing, wherein a portion of the optical fiber is coiled around an outer-diameter surface of the drum member. In some embodiments, the first housing includes a hollow cylindrical portion, the system further including a drum member located within the inner volume of the first housing, wherein the drum member itself has a hollow interior volume and a further portion of the optical fiber is coiled around an inner-diameter surface of the drum member. In some embodiments, the first housing includes a hollow cylindrical portion, the system further comprising a drum member located within the inner volume of the first housing, wherein the thermal-management material is located between the first inner surface of the first housing and an outer-diameter surface of the drum member.

In some embodiments, the present invention provides a method for removing excess heat from an optical fiber, the method including providing the optical fiber; providing a temperature-management device, wherein the temperature-management device includes: a first housing having a first outer-perimeter surface and an inner volume facing a first inner surface, wherein the inner volume has a length, a plurality of fiber-support members coupled to the first inner surface of the first housing, and a thermal-management material; coiling the optical fiber around the inner volume of the first housing, wherein the coiling of the optical fiber includes forming a plurality of point contacts between the optical fiber and each one of the plurality of fiber-support members; and surrounding the optical fiber with the thermal-management material except in locations where the optical fiber contacts the plurality of fiber-support members.

In some embodiments of the method, the first housing includes a hollow cylindrical portion, wherein the temperature-management device further includes a drum member, and wherein the coiling of the optical fiber around the inner volume of the first housing includes coiling the optical fiber around an outer-diameter surface of the drum member.

In some embodiments, the present invention provides a system for removing excess heat from an optical fiber. This system includes the optical fiber; housing means for packaging the optical fiber; means for coiling the optical fiber around an inner volume of the housing means such that a plurality of point contacts are formed between the optical fiber and the housing means; and means for thermally managing the optical fiber, wherein the means for thermally managing surrounds the optical fiber except in locations where the optical fiber contacts the housing means.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment). Further, some embodiments include fewer than all the components described as part of any one of the embodiments described herein.

All publications patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. Some embodiments of the present invention can be used as laboratory equipment.

As used herein the term "about" refers to ±10% inclusive. As used herein the term "most" refers to more than 50%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The term "in some embodiments" and the word "optionally" are used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It is to be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integer numbers there between.

As used herein the term "method" refers to manners, means, techniques and procedures for accomplishing a given task including those manners, means, techniques and procedures either known to, or readily developed from known manners, means, techniques and procedures by practitioners of the optical, electrical, semiconductor, chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An optical-fiber packaging system comprising:
   an optical fiber; and
   a temperature-management device configured to remove excess heat from the optical fiber, the temperature-management device including:
   a first housing having a first outer-perimeter surface and an inner volume facing a first inner surface, wherein the inner volume has a length,
   a plurality of fiber-support members coupled to the first inner surface of the first housing, wherein each of the plurality of fiber-support members has a plurality of point supports arranged along the length of the inner volume, and wherein each point support is configured to provide a point contact with the optical fiber, and wherein the optical fiber follows a coiled path around the inner volume, and a thermal-management material that surrounds the optical fiber except for locations where the optical fiber contacts the plurality of fiber-support members.

2. The system of claim 1, wherein the thermal-management material is located within the inner volume of the first housing, wherein the inner volume of the first housing has an ambient temperature when the system is not in normal active operation, wherein the inner volume has an operational temperature when the system is in normal active operation, and wherein the thermal-management material is in a solid state at the ambient temperature and in a liquid state at the operational temperature.

3. The system of claim 1, wherein the thermal-management material is located within the inner volume of the first housing, wherein the inner volume of the first housing has an ambient temperature when the system is not in normal active operation, wherein the inner volume has an operational temperature when the system is in normal active operation, wherein the thermal-management material is in a solid state at the ambient temperature and in a liquid state at the operational temperature, wherein the first housing comprises at least one passage located between the first outer-perimeter surface and the first inner surface, and wherein the at least one passage includes a heat-exchange module configured to pre-heat the inner volume of the first housing such that the operational temperature of the inner volume is reached prior to normal active operation of the system.

4. The system of claim 1, wherein the thermal-management material is located within the inner volume of the first housing, wherein the inner volume of the first housing has an ambient temperature when the system is not in normal active operation, wherein the inner volume has an operational temperature when the system is in normal active operation, wherein the thermal-management material is in a solid state at the ambient temperature and in a liquid state at the operational temperature, wherein the first housing comprises at least one passage located between the first outer-perimeter surface and the first inner surface, wherein the at least one passage includes a heat-exchange module configured to pre-heat the inner volume of the first housing such that the operational temperature of the inner volume is reached prior to normal active operation of the system, and wherein the heat-exchange module includes a pre-heat fluid that is circulated within the at least one passage.

5. The system of claim 1, wherein the thermal-management material is located within the inner volume of the first housing, wherein the inner volume of the first housing has an ambient temperature when the system is not in normal active operation, wherein the inner volume has an operational temperature when the system is in normal active operation, wherein the thermal-management material is in a solid state at the ambient temperature and in a liquid state at the operational temperature, wherein the first housing comprises at least one passage located between the first outer-perimeter surface and the first inner surface, wherein the at least one passage includes a heat-exchange module configured to pre-heat the inner volume of the first housing such that the operational temperature of the inner volume is reached prior to normal active operation of the system, and wherein the heat-exchange module includes a resistance heat element.

6. The system of claim 1, wherein each one of the plurality of fiber-support members is formed as a plurality of projecting teeth on the first inner surface of the first housing and along a line that extends from one end of the inner volume to an opposite end of the inner volume.

7. The system of claim 1, wherein each one of the plurality of fiber-support members is integral with the first housing.

8. The system of claim 1, wherein each one of the plurality of fiber-support members is a separable piece held to the first inner surface of the first housing.

9. The system of claim 1, wherein each one of the plurality of fiber-support members has a plurality of grooves formed therein, and wherein each groove defines one of the plurality of point supports.

10. The system of claim 1, wherein each one of the plurality of fiber-support members has a plurality of grooves formed therein, and wherein each groove is V shaped and defines two point supports of the plurality of point supports that are in contact with the optical fiber.

11. The system of claim 1, wherein each one of the plurality of fiber-support members has a plurality of slots formed therein, and wherein each slot defines one of the plurality of point supports.

12. The system of claim 1, wherein the optical fiber, during normal active operation of the system, does not contact the first inner surface of the first housing except at the point contacts.

13. The system of claim 1, wherein the first housing comprises a hollow cylindrical portion, wherein a cross-section of the first housing perpendicular to a length axis has a closed perimeter.

14. The system of claim 1, wherein the first housing comprises a hollow cylindrical portion, wherein a cross-section of the first housing perpendicular to a length axis has a circular shape except for the plurality of fiber-support members.

15. The system of claim 1, wherein the first housing comprises a hollow cylindrical portion, the system further comprising a drum member located within the inner volume of the first housing.

16. The system of claim 1, wherein the first housing comprises a hollow cylindrical portion, the system further comprising a drum member located within the inner volume of the first housing, wherein a portion of the optical fiber is coiled around an outer-diameter surface of the drum member.

17. The system of claim 1, wherein the first housing comprises a hollow cylindrical portion, the system further comprising a drum member located within the inner volume of the first housing, wherein the drum member itself has a hollow interior volume and a further portion of the optical fiber is coiled around an inner-diameter surface of the drum member.

18. A method for removing excess heat from an optical fiber, the method comprising:
proviing the optical fiber;
providing a temperature-management device, wherein the temperature-management device includes:
a first housing having a first outer-perimeter surface and an inner volume facing a first inner surface, wherein the inner volume has a length,
a plurality of fiber-support members coupled to the first inner surface of the first housing, and
a thermal-management material;
coiling the optical fiber around the inner volume of the first housing, wherein the coiling of the optical fiber includes forming a plurality of point contacts between the optical fiber and each one of the plurality of fiber-support members; and
surrounding the optical fiber with the thermal-management material except at locations where the optical fiber contacts the plurality of fiber-support members.

19. The method of claim 18, wherein the first housing comprises a hollow cylindrical portion, wherein the temperature-management device further includes a drum member, and wherein the coiling of the optical fiber around the inner volume of the first housing includes coiling the optical fiber around an outer-diameter surface of the drum member.

20. A system for removing excess heat from an optical fiber comprising:
- the optical fiber;
- means for housing the optical fiber;
- means for coiling the optical fiber around an inner volume of the means for housing such that a plurality of point contacts are formed between the optical fiber and the means for housing; and
- means for thermally managing the optical fiber, wherein the means for thermally managing covers the optical fiber except at locations where the optical fiber contacts the means for housing.

* * * * *

UNITED STATES PATENT AND TRADEMARK OFFICE
CERTIFICATE OF CORRECTION

| | | |
|---|---|---|
| PATENT NO. | : 8,923,679 B2 | Page 1 of 1 |
| APPLICATION NO. | : 13/831477 | |
| DATED | : December 30, 2014 | |
| INVENTOR(S) | : Andrew Xing | |

It is certified that error appears in the above-identified patent and that said Letters Patent is hereby corrected as shown below:

On the title page item 72

In the inventor's name:
                Delete "Andrew C. Xing" and insert
                  --Andrew Xing-- therefor.

Signed and Sealed this
Twenty-second Day of March, 2016

Michelle K. Lee
*Director of the United States Patent and Trademark Office*